United States Patent
Shin et al.

(10) Patent No.: US 11,649,300 B2
(45) Date of Patent: May 16, 2023

(54) EXTRACTION METHOD OF CHITIN NANOCRYSTALS USING ELECTRON BEAM IRRADIATION AND CHITIN NANOCRYSTAL POWDER

(71) Applicant: KOREA RESEARCH INSTITUTE OF CHEMICAL TECHNOLOGY, Daejeon (KR)

(72) Inventors: Jihoon Shin, Daejeon (KR); Hyunho Lee, Daejeon (KR); Yeong Un Kim, Daejeon (KR)

(73) Assignee: KOREA RESEARCH INSTITUTE OF CHEMICAL TECHNOLOGY, Daejeon (KR)

(*) Notice: Subject to any disclaimer, the term of this patent is extended or adjusted under 35 U.S.C. 154(b) by 350 days.

(21) Appl. No.: 16/999,157

(22) Filed: Aug. 21, 2020

(65) Prior Publication Data
US 2021/0054107 A1  Feb. 25, 2021

(30) Foreign Application Priority Data
Aug. 21, 2019 (KR) .................. 10-2019-0102697

(51) Int. Cl.
 *C08B 37/08* (2006.01)
 *B01J 19/08* (2006.01)

(52) U.S. Cl.
 CPC .......... *C08B 37/003* (2013.01); *B01J 19/085* (2013.01)

(58) Field of Classification Search
 CPC ............... C08B 37/003; B01J 19/081–087
 See application file for complete search history.

(56) References Cited

FOREIGN PATENT DOCUMENTS

| CN | 106868631 | * | 6/2017 | ............. B82Y 30/00 |
| JP | 2015-193956 A | | 11/2015 | |
| JP | 6134445 B2 | | 5/2017 | |
| KR | 2017-0113257 A | | 10/2017 | |

OTHER PUBLICATIONS

Salaberria, A. etal "Different routes to turn chitin into stunning nano-objects" Eur. Polym. J., vol. 68, pp. 503-515. (Year: 2015).*
Machine translation of CN 1066868631. (Year: 2017).*
Goodrich, J. et al "alpha-Chitin nanocrystals prepared from shrimp shells . . . " Biomacromol., vol. 8, No. 1. (Year: 2007).*
J. Jiang et al. "Chitin nanocrystals prepared by oxidation of ?-chitin using the O2/laccase/TEMPO system". Carbohydrate Polymers 189 (2018) 178-183.
Fan et al. "Chitin nanocrystals prepared by TEMPO-mediated oxidation of ?-chitin". Biomacromolecules 9 (2008) 192-198.
Goodrich et al. "?-Chitin nanocrystals prepared from shrimp shells and their specific area measurement". Biomacromolecules 8 (2007) 252-257.
Lee, Minwoo et al. "Facile and Eco-friendly Extraction of Cellulose Nanocrystals via Electron Beam Irradiation Followed by High-pressure Homogenization." *Green Chem.*, vol. 20, No. 11, pp. 2596-2610 (2018).

* cited by examiner

*Primary Examiner* — Leigh C Maier
(74) *Attorney, Agent, or Firm* — Harness, Dickey & Pierce, P.L.C.

(57) ABSTRACT

The present disclosure relates to a method for extracting chitin nanocrystals through electron beam irradiation comprising the steps of: (i) irradiating a chitin-based solid material with an electron beam; (ii) washing the chitin-based solid material subjected to electron beam irradiation; (iii) adding a basic solution to the washed chitin-based solid material; (iv) high-pressure homogenizing the chitin-based solid material dispersed in an aqueous system to which the basic solution is added, to prepare a suspension containing chitin nanocrystals.

17 Claims, 27 Drawing Sheets

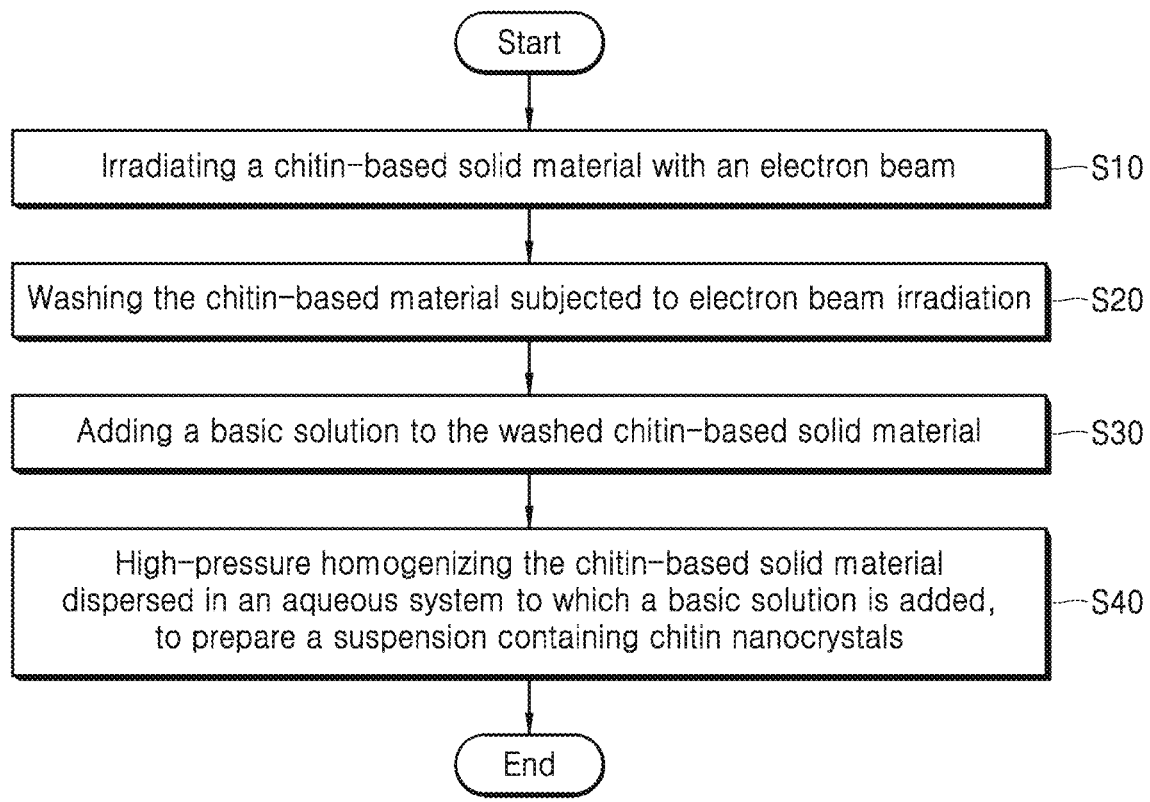

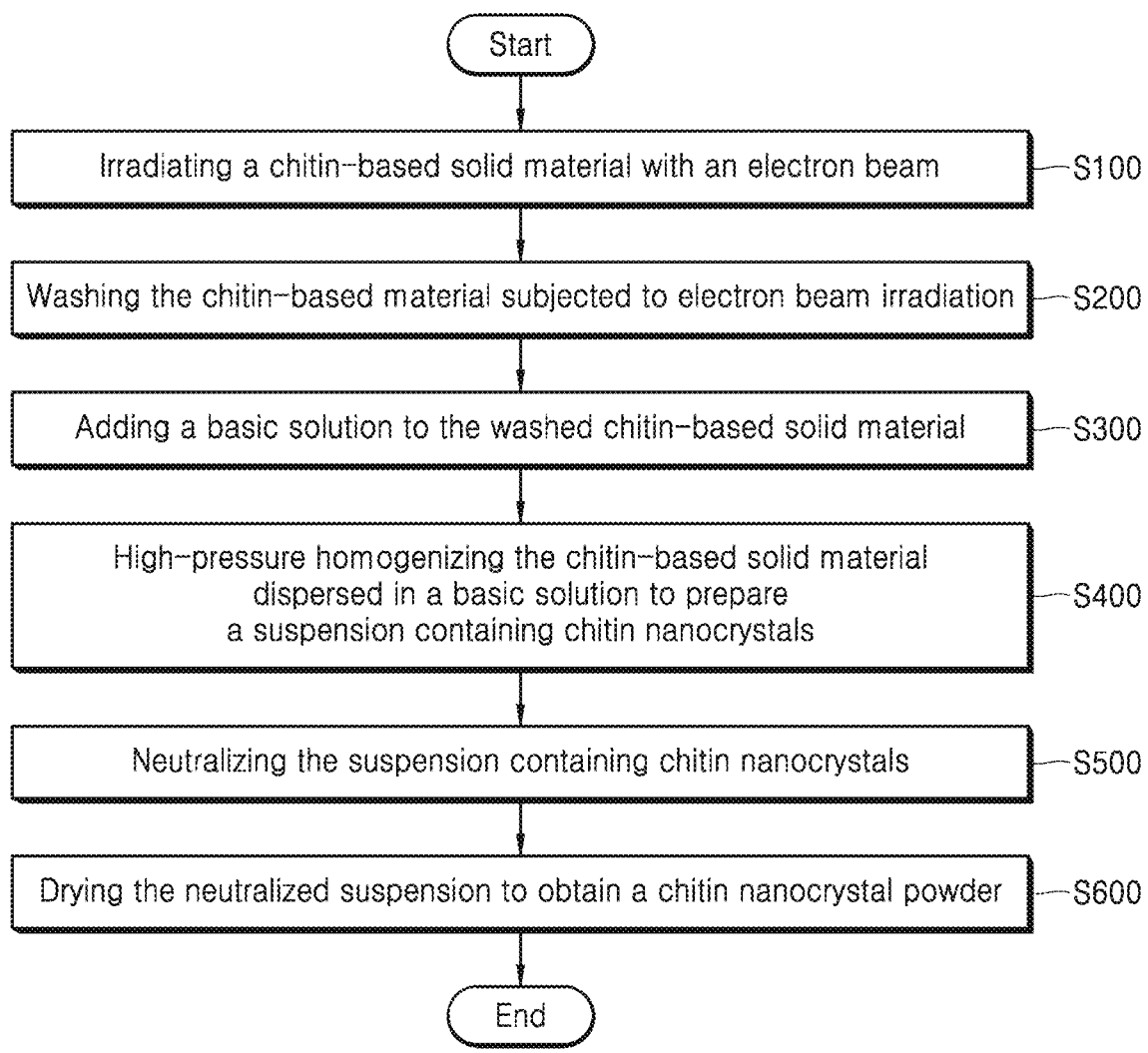

EXTRACTION METHOD OF CHITIN NANOCRYSTALS USING ELECTRON BEAM IRRADIATION AND CHITIN NANOCRYSTAL POWDER

CROSS-REFERENCE TO RELATED APPLICATION

This application claims priority to Korean Patent Application No. 10-2019-0102697 filed on Aug. 21, 2019, and all the benefits accruing therefrom under U.S.C. § 119, the contents of which is incorporated by reference in its entirety.

BACKGROUND OF THE INVENTION

1. Field of the Invention

The present disclosure relates to an extraction method of chitin nanocrystals through electron beam irradiation and a chitin nanocrystal powder prepared thereby.

2. Description of the Related Art

Recently, due to the excellent physical properties of nano-sized materials, interest in making reinforced composite materials (nano-composite materials) is greatly increasing worldwide. Currently, most studies use inorganic materials such as nano clay and carbon nanotube and organic materials such as nanocellulose and chitin as the reinforcing materials for making nanocomposite materials.

Chitin is the material abundant in the biological resources on the earth subsequent to cellulose. As various uses of chitin were revealed in the process of searching for new bioactive materials that started from the 1970s, commercial studies have been conducted for use in surgical artificial skin, biodegradable films, water treatment flocculants, and cosmetic raw materials. Recently, it has been used as high value-added medicine, pharmacy, biological industry and cosmetic materials.

In particular, chitin has more excellent mechanical properties than insoluble materials or cellulose, and is excellent in biodegradability. Further, chitin has very low cytotoxicity, has antibacterial and anti-inflammatory effects, and is excellent in biocompatibility, and thus is often used as a medical suture.

Moreover, chitin is used to manufacture semi-crystalline nanofibers, and has a high aspect ratio and a polyfunctional group, and thus has been researched and developed as reinforced polymer nanocomposites. Despite such a applicability, chitin brings many changes in physical properties according to its structural properties, so there are many limitations in practical applications.

Meanwhile, when chitin is hydrolyzed by an acid, the amorphous region has very fast hydrolysis rate as compared with the crystalline region. Thus, when chitin is hydrolyzed under appropriate conditions, a chitin nanocrystal mainly composed of a crystalline region can be obtained.

A typical method for obtaining chitin nanocrystals includes hydrolyzing with strong acids such as sulfuric acid, hydrochloric acid, or nitric acid, diluting with water, repeatedly washing, followed by storing in the state of a suspension dispersed in water after continuous centrifugation process and dialysis, and mechanical processing using ultrasonic wave.

The prior art spends a long process time, has a low yield and adversely affects the environment, the commercial use of chitin nanocrystals is greatly limited.

Further, since chitin nanocrystals are stored in a state of suspension that is dispersed in water, it is expensive to store and transport them.

In order to overcome disadvantages such as long process time in washing process and low temperature resistance of the produced nanocrystals, there is a need to develop an efficient, environmentally friendly and economical method for producing chitin nanocrystals develop In particular, in order to be used as various composite materials, the thermal stability of chitin and the stability of particles when dispersed in an aqueous solution are required. However, hydrolysis using strong acid has a problem of seriously reducing the thermal stability because sulfate ions remain on the surface of chitin nanocrystals. Further, since the stability of chitin nanocrystals cannot be maintained during dispersion, there are many limitations in utilizing it.

Therefore, there is an urgent need to develop a method for extracting chitin nanocrystals that is environmentally friendly, highly economical, highly efficient, has high thermal stability and dispersion stability of particles, and thus can be utilized in various composite materials.

SUMMARY OF THE INVENTION

The present disclosure has been designed to solve the above-mentioned problems, and an object thereof is to obtain chitin nanocrystals with high yield through electron beam irradiation and high pressure-homogenization instead of hydrolysis by acid treatment or toxic chemical material treatment.

It is another object of the present disclosure to extract chitin nanocrystals in a highly efficient and environment-friendly manner through electron beam treatment of chitin-based materials, thereby providing industrial sustainability of chitin nanocrystals.

It is another object of the present disclosure to produce a chitin nanocrystal powder having improved redispersibility by a simpler process.

The technical objects of the present disclosure are not limited to the aforementioned objects, and other objects, which are not mentioned above, will be apparent to a person having ordinary skill in the art from the following description.

In order to achieve the above-mentioned objects, according to an aspect of the present disclosure, there is provided a method for extracting chitin nanocrystals through electron beam irradiation comprising the steps of: (i) irradiating a chitin-based solid material with an electron beam; (ii) washing the chitin-based solid material subjected to electron beam irradiation; (iii) adding a basic solution to the washed chitin-based solid material; and (iv) high-pressure homogenizing the chitin-based solid material dispersed in an aqueous system to which the basic solution is added, to prepare a suspension containing chitin nanocrystals.

According to another aspect of the present disclosure, there is provided a method for extracting chitin nanocrystals through electron beam irradiation comprising the steps of: (a) irradiating a chitin-based solid material with an electron beam; (b) washing the chitin-based solid material subjected to electron beam irradiation; (c) adding a basic solution to the washed chitin-based solid material; (d) high-pressure homogenizing the chitin-based solid material dispersed in an aqueous system to which the basic solution is added, to prepare a suspension containing chitin nanocrystals; (e) neutralizing suspension containing chitin nanocrystals; and (f) drying the neutralized suspension to obtain a chitin nanocrystal powder.

The electron beam irradiation dose may be 1000 to 3000 KGy.

The step (i) or (a) may be a step of irradiating a chitin-based solid material with an electron beam to oxidize a hydroxy group (—OH) of the chitin-based solid material to a carboxylate (—COO$^-$) group.

The step (ii) or (b) may be a step of filtering and washing with water the chitin-based solid material subjected to electron beam irradiation The step (iii) or (c) may be a step of adding a basic solution to the washed chitin-based solid material to adjust the pH to 9 to 11.

The step (iii) or (c) may be a step of irradiating a chitin-based solid material with an electron beam to oxidize a hydroxy group (—OH) of the chitin-based solid material to a carboxylate (—COO$^-$) group, and adding a basic solution thereto to introduce Na$^+$ or K$^+$, which is a counter ion having a charge opposite in sign to the carboxylate (—COO—) group charge.

The chitin nanocrystals may have an average width of 10 to 20 nm and an average length of 261 to 757 nm.

The high-pressure homogenization may be performed less than 1-5 times at 20 to 25° C. under a pressure of 20,000 to 25,000 psi.

The step (e) may be a step of injecting an air containing carbon dioxide into the suspension containing chitin nanocrystals to neutralize the suspension.

According to yet another aspect of the present disclosure, there is provided a chitin nanocrystal powder comprising a carboxylate (—COO$^-$) group; and a counter ion having a charge opposite in sign to the carboxylate (—COO$^-$) group charge.

The counter ion may be Na$^+$ or K$^+$.

The method for extracting chitin nanocrystals of the present disclosure is very environmentally-friendly because it can obtain chitin nanocrystals by irradiating an electron beam under room temperature and atmospheric pressure without using acid or toxic chemicals.

Also, due to the electron beam irradiation and high pressure dispersion process, it greatly reduces the process unit and is very efficient in the entire process, as compared with the conventional hydrolysis process by acid treatment or toxic chemical material treatment.

Further, since the chitin-based material is oxidized by irradiating the chitin-based material with an electron beam, it can exist in a stable suspension state.

Further, since the shape, aspect ratio, width and length of the chitin nanocrystals produced by adjusting the electron beam irradiation dose can be controlled, it can be applied to various composite materials.

Further, the chitin nanocrystal powder prepared subjecting the electron beam-irradiated chitin to the alkali treatment and neutralization process is very excellent in redispersibility.

In addition, the chitin nanocrystal according to the present disclosure is excellent in redispersibility, and is stored and transported in a powder state, and thus has an excellent economical effect.

The effects of the present disclosure are not limited to the effects described above, and are understood to include all effects that can be inferred based on the detailed description of the present disclosure or the invention described in the claims.

BRIEF DESCRIPTION OF THE DRAWINGS

FIG. 1 is a process flowchart of a method for extracting chitin nanocrystals through electron beam irradiation according to an embodiment of the present disclosure.

FIG. 2 is a process flowchart of a method for extracting chitin nanocrystals through electron beam irradiation according to another embodiment of the present disclosure.

DETAILED DESCRIPTION OF THE INVENTION

Figure 3A:
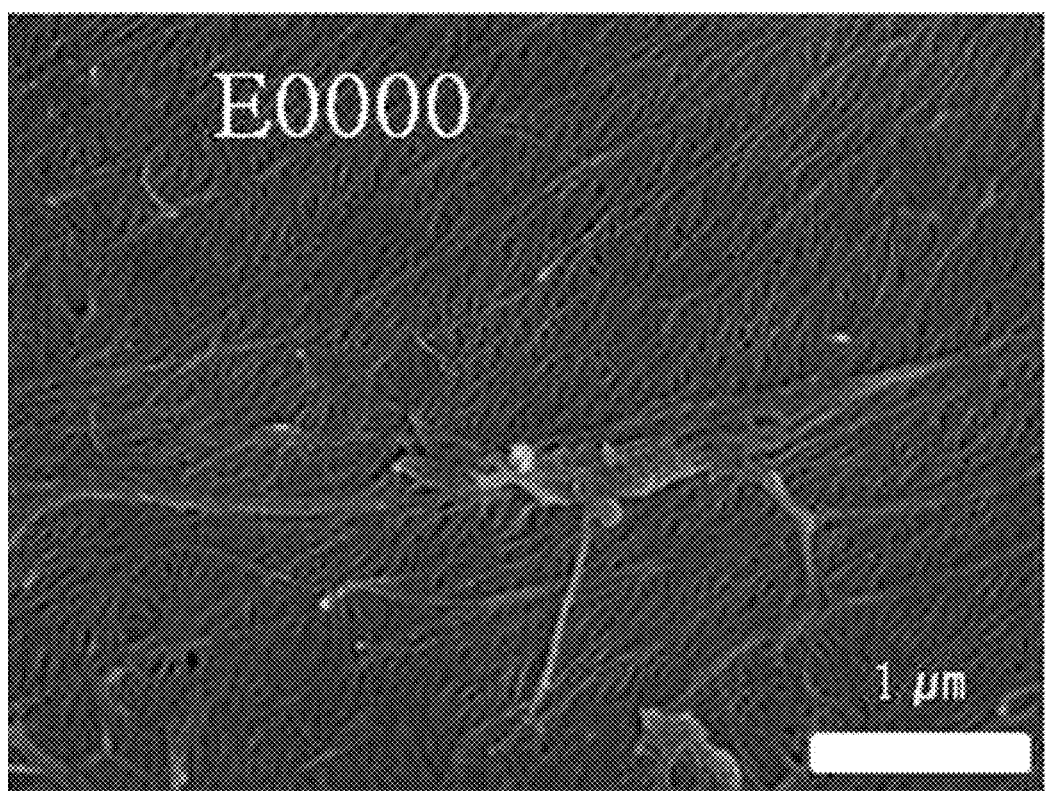
FIG. 3A is scanning electron micrographs of chitin powders according to the irradiation doses of 0 kGy.
Figure 3B:
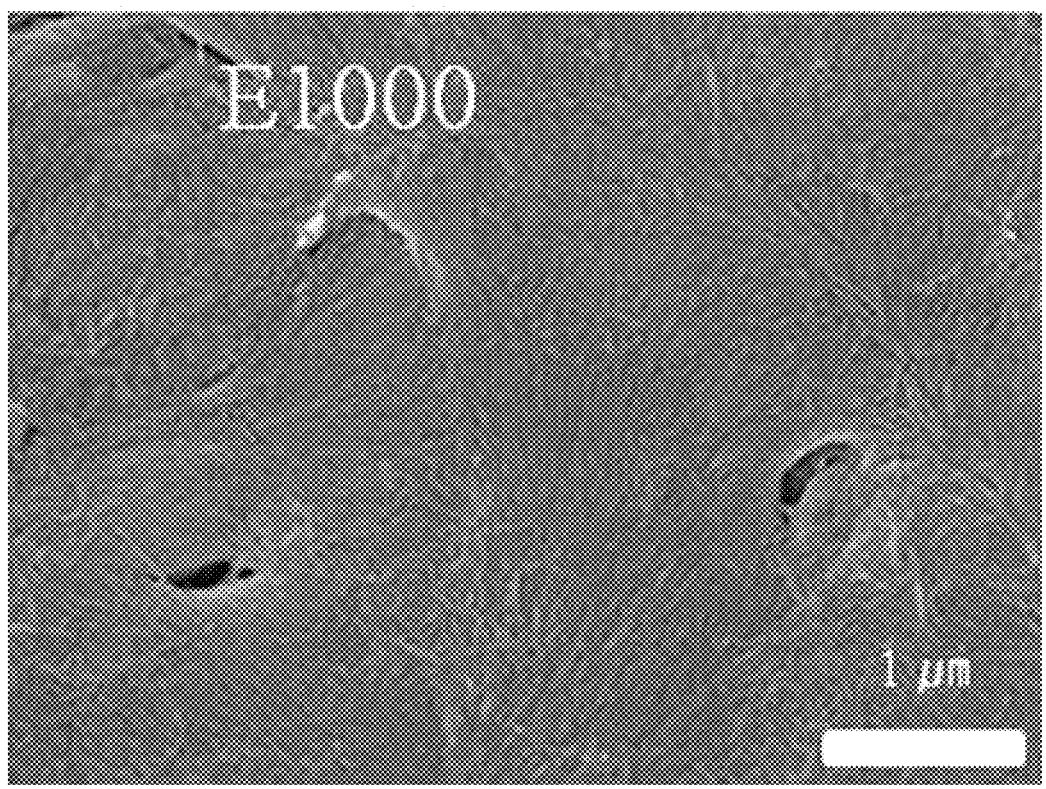
FIG. 3B is scanning electron micrographs of chitin powders according to the irradiation doses of 1000 kGy.
Figure 3C:
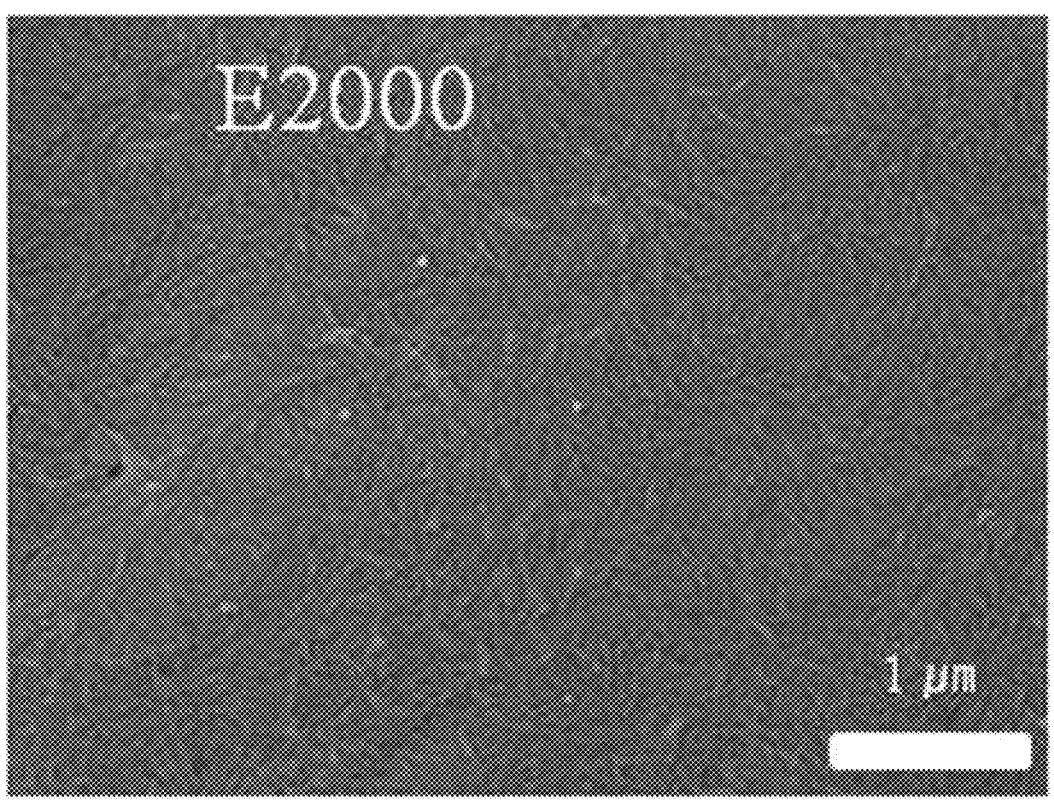
FIG. 3C is scanning electron micrographs of chitin powders according to the irradiation doses of 2000 kGy.
Figure 3D:
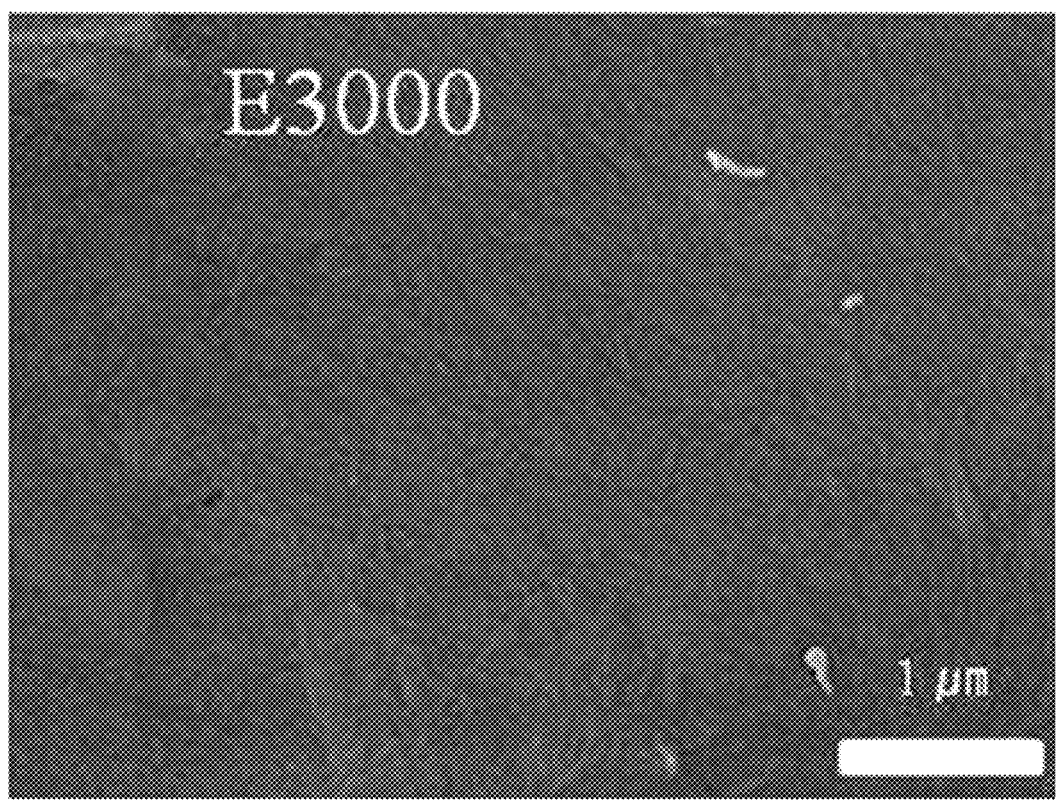
FIG. 3D is scanning electron micrographs of chitin powders according to the irradiation doses of 3000 kGy, in a method for extracting chitin nanocrystals through electron beam irradiation according to the present disclosure.

Prior to a detailed description of the present disclosure, it should be understood that the terms and wordings used herein should not be construed to be limited to general or dictionary meaning and the concepts of the terms may be defined to describe the invention made by the inventor(s) of the present disclosure in the best way, and moreover the terms and wordings should be constructed to have meanings and concepts that agree with the technical spirit of the present disclosure.

That is, it should be understood that the terms used herein are used only to described preferred embodiments of the present disclosure, but are not used to limit the contents of the present disclosure, and the terms are defined in consideration of various possibilities of the present disclosure.

Further, it should be understood that in the specification, a similar expression may include a plural expression unless it is indicated clearly, and a plural expression may include a singular form similarly.

Throughout the specification, when it is described that an element "includes" another element, it may mean that the first element may further includes any other element without excluding the other element unless a particularly contradictory description is made.

Further, in the following description of the present disclosure, a detailed description of configurations that is determined to the essence of the present disclosure unnecessarily obscure, for example, known technology including the conventional technology, may be omitted.

While the present inventors have been trying to obtain chitin nanocrystals from a chitin-based solid material (for example, chitin powder or chitin fiber), they have confirmed that the degree of polymerization and molecular weight of the chitin fiber were lowered in a short pretreatment process through electron beam dissociation in the solid state, and thus, the chitin-based solid material can be dissociated. They further confirmed that the basic solution introduce a counter ion to the oxidized chitin-based solid material, which thus prevents hydrogen bonds occurring during spray drying, and maintains dispersion stability during redispersion to be applicable to various composite materials, and thus can be applied to various composite materials.

Hereinafter, the method for extracting chitin nanocrystals through electron beam irradiation according to the present disclosure will be described.

According to an embodiment of the present disclosure, a method for extracting chitin nanocrystals through electron beam irradiation is provided, including the steps of:
(i) irradiating a chitin-based solid material with an electron beam;
(ii) washing the chitin-based solid material subjected to electron beam irradiation;
(iii) adding a basic solution to the washed chitin-based solid material;
(iv) high-pressure homogenizing the chitin-based solid material dispersed in an aqueous system to which the basic solution is added, to prepare a suspension containing chitin nanocrystals.

FIG. 1 is a process flowchart of a method for extracting chitin nanocrystals through electron beam irradiation according to an embodiment of the present disclosure.

Referring to FIG. 1, first, a chitin-based solid material is irradiated with an electron beam (S10).

The S10 may be a step of irradiating a chitin-based solid material with an electron beam to reduce the chain length of the chitin-based solid material and oxidizing the chitin-based solid material.

The chitin-based solid material refers to chitin fibers in which crystalline regions and non-crystalline regions are mixed.

The chitin-based solid material may be a powdery chitin obtained from natural resources such as crab shell or squid cartilage, or may be chitosan produced by deacetylating the chitin.

The electron beam is a continuous flow of uniform electrons emitted from an electron gun, and the wavelength may be similar to that of X-rays at an accelerating voltage.

When the electron beam is similar to the wavelength of X-rays, the molecule or crystal lattice can be irradiated with electrons to promote physiochemical changes of the material to be irradiated without contamination or by-products.

In particular, the electron beam attacks the amorphous part of the chitin fiber and promotes dissociation of the chitin fiber.

Chitin has a structure in which molecules are connected by chains, and irradiation of such chitin fiber with an electron beam promotes formation of free electrons due to the crushing of glucoside bond between chain and chain.

The free electrons can change the amount of charge on the surface of the chitin fiber or have a negative charge.

When the surface of the chitin fiber exhibits a negative charge, dispersion stability may be increased due to the ionic repulsive force between chitin fibers when dispersed in an acqueous system.

In the S10, the electron beam irradiation dose may be 1000 to 3000 KGy.

Within the above range, free electrons according to the electron beam irradiation dose can promote chain cleavage and oxidation of chitin fibers to dissociate chitin fibers.

When the electron beam irradiation dose is less than 1000 KGy, the chitin fiber promotes the chain-linking reaction and has no effect on the chitin crystal separation process. When the electron beam irradiation dose is more than 3000 KGy, it may not be possible to maintain the shape of the sample chitin fiber.

Specifically, as the electron beam irradiation dose increases within the electron beam irradiation dose range, the chains of the chitin-based solid material can promote the cleavage to dissociate the chitin-based solid material.

That is, the polymerization degree of chitin can be adjusted according to the electron beam irradiation dose. As the electron beam dose increases within the electron beam irradiation dose range, the degree of polymerization (DP) of the chitin-based solid material can be significantly reduced.

The degree of polymerization of the chitin-based solid material subjected to electron beam irradiation may be 100 to 500, specifically 190 to 400.

Further, by irradiating a chitin-based solid material with an electron beam in the electron beam irradiation dose range, it can promote oxidation of a hydroxy group (—OH) of the chitin-based solid material to a carboxylate group (—COO$^-$) to dissociate the chitin-based solid material. Since the chitin-based solid material is oxidized from a hydroxy group (—OH) to a carboxylate group (—COO$^-$), the chitin-based solid material subjected to electron beam irradiation may exist in a stable suspension state when dispersed in an aqueous system.

Next, the chitin-based solid material subjected to electron beam irradiation is washed (S20).

The S20 may be a step of washing the chitin-based solid material subjected to electron beam irradiation in order to remove the oliogomerized chitin-based solid material or impurities, after irradiating a chitin-based solid material with an electron beam in the S10.

Specifically, the chitin-based solid material subjected to electron beam irradiation is injected into a filter together with water, so that the oligomerized chitin-based solid material is dissolved in water and removed together with impurities, thereby obtaining the chitin-based solid material subjected to electron beam irradiation which is not dissolved in water.

Next, a basic solution is added to the washed chitin-based solid material (S30).

The S30 may be a step of adding a basic solution to the washed chitin-based solid material, in order to facilitate high-pressure homogenization of the washed chitin-based solid material and improve the redispersibility of the finally obtained chitin nanocrystals.

Specifically, in order to facilitate high-pressure homogenization of the washed chitin-based solid material and improve the redispersibility of the finally obtained chitin nanocrystals, the S30 may be a step in which the chitin-based solid material subjected to electron beam irradiation is washed with water in the S20, to remove water in which the oligomer is dissolved, thereby obtaining a chitin-based solid material subjected to electron beam irradiation, which is then dispersed in water again to form a slurry state, and a basic solution is added thereto.

That is, it may be a step of adding a basic solution to the washed chitin-based solid material dispersed in an aqueous system.

In the S30, after washing the chitin-based material subjected to electron beam irradiation, a basic solution is added to the washed chitin-based solid material dispersed in an aqueous system to adjust the pH to 9 to 11, specifically pH 11.

When a basic solution is added to the washed chitin-based solid material dispersed in an aqueous system to adjust the pH to 9 to 11, the chitin-based solid material is swelled with a basic solution, which can be easily nanofibrillated during high-pressure homogenization.

Further, when a basic solution is added to the washed chitin-based solid material dispersed in an aqueous system to adjust the pH to 9 to 11, the chitin-based solid material introduces a counter ion by a basic solution, which prevent strong hydrogen bonds generated during spray drying and facilitate redispersibility of the finally obtained chitin nanocrystal powder.

Specifically, it may be a step of irradiating the chitin-based solid material with an electron beam, adding a basic solution to the chitin-based solid material in which a hydroxy group (—OH) of the chitin-based solid material is oxidized to a carboxylate group (—COO$^-$), and introducing Na$^+$ or K$^+$, which is a counter ion having a charge opposite in sign to the carboxylate group (—COO$^-$) charge.

At this time, the basic solution may be a sodium hydroxide solution or a potassium hydroxide solution.

After washing the chitin-based material subjected to electron beam irradiation, the S30 is a step of removing water in which the oligomer is dissolved, obtaining the chitin-based solid material subjected to electron beam irradiation, and then dispersing it in water again to form a slurry state, adding a basic solution to the washed chitin-based solid material dispersed in an aqueous system to adjust the pH to 9 to 11, and then stirring the resulting mixture for 1 to 2 hours.

When stirring for the time in the above range, the washed chitin-based solid material is evenly swelled, which can thus be easily nanofibrillated during high-pressure homogenization.

Next, the chitin-based solid material dispersed in an aqueous system to which the basic solution is added is homogenized under high pressure to prepare a suspension containing chitin nanocrystals (S40). The S40 may be a step of high-pressure homogenizing a chitin-based solid material dispersed in an aqueous system to which the basic solution is added, to subject the chitin-based solid material to nanofibrillation, and transmitting a strong shear force to the chitin-based solid material to separate a chitin-based solid material, specifically a chitin fiber fragment, thereby producing a chitin nanocrystal.

The high-pressure homogenization is a type of mechanical treatment, and may be performed by any one device selected from the group consisting of a high-pressure homogenizer, a grinding device, a pulverizing device, and an ultrasonicator, and it is preferred to use a high-pressure homogenizer.

The high-pressure homogenization may be carried out less than 1 to 5 times at 20 to 25° C. under a pressure of 20,000 to 25,000 psi.

Further, when the high-pressure homogenization is repeated one or more times, chitin nanocrystals having a high yield can be produced.

When the high-pressure homogenization is carried out two or more times, a chitin-based solid material dispersed in an aqueous system to which a basic solution is added is high-pressure homogenized twice at 20 to 25° C. under a pressure of 20,000 to 25,000 psi, and then impurities settled through centrifugation are removed to obtain chitin nanocrystals. This process can be carried out repeatedly less than 5 times.

The chitin nanocrystals produced through the high-pressure homogenization have an average width of 10 to 20 nm and an average length of 261 to 757 nm.

The chitin nanocrystals obtained through the high-pressure homogenization have greatly increased thermal stability and permeability, and can maintain high dispersion stability when redispersed in an aqueous system.

After the S40, the suspension containing chitin nanocrystals produced through the high-pressure homogenization can be dried to obtain a chitin nanocrystal powder.

Meanwhile, a method for extracting chitin nanocrystals through electron beam irradiation according to the present disclosure may further include a step of neutralizing the suspension containing chitin nanocrystals, in order to improve the stability and redispersibility of the chitin nanocrystal powder obtained after the S40.

Specifically, according to another embodiment of the present disclosure, there is provided a method for extracting chitin nanocrystals through electron beam irradiation comprising the steps of:
 (a) irradiating a chitin-based solid material with an electron beam;
 (b) washing the chitin-based solid material subjected to electron beam irradiation;
 (c) adding a basic solution to the washed chitin-based solid material;
 (d) high-pressure homogenizing the chitin-based solid material dispersed in an aqueous system to which the basic solution is added, to prepare a suspension containing chitin nanocrystals.
 (e) neutralizing suspension containing chitin nanocrystals; and
 (f) drying the neutralized suspension to obtain a chitin nanocrystal powder.

FIG. 2 is a process flowchart of a method for extracting chitin nanocrystals through electron beam irradiation according to another embodiment of the present disclosure.

Referring to FIG. 2, first, a chitin-based solid material is irradiated with an electron beam (S100).

The S100 may be a step of irradiating an electron beam to the chitin-based solid material to reduce the chain length of the chitin-based solid material, and oxidizing the chitin-based solid material.

The chitin-based solid material refers to chitin fibers in which crystalline regions and non-crystalline regions are mixed.

The chitin-based solid material may be a powdery chitin obtained from natural resources such as crab shell or squid cartilage, and it may be a chitosan produced by deacetylating the chitin.

The electron beam is a continuous flow of uniform electrons emitted from an electron gun, and may be similar to an wavelength of X-rays with an accelerating voltage.

When the electron beam is similar to the wavelength of the X-ray, electrons are irradiated to the molecule or crystal lattice to promote physicochemical changes of the material to be irradiated without contamination or by-products.

In particular, the electron beam attacks the amorphous portion of the chitin fiber to promote dissociation of the chitin fiber.

Chitin has a structure in which molecules are connected by chains, and by irradiating the chitin fiber with an electron beam, the formation of free electrons due to the crushing of glucoside bond between chain and chain is promoted.

The free electrons can change the amount of charge on the surface of the chitin fiber or serves to have a negative charge.

When the surface of the chitin fiber exhibits a negative charge, dispersion stability may be increased due to an ionic repulsive force between the chitin fibers when dispersed in an aqueous system.

In the S100, the electron beam irradiation dose may be 1000 to 3000 KGy.

Within the above range, free electrons according to the electron beam irradiation dose can promote chain cleavage and oxidation of chitin fibers to dissociate chitin fibers.

When the electron beam irradiation dose is less than 1000 KGy, it promotes chain-linking reaction in chitin fibers and so it has no effect on the chitin crystal separation process. When the electron beam irradiation dose is more than 3000 KGy, it may not be possible to maintain the shape of the sample chitin fiber.

Specifically, as the electron beam irradiation dose increases within the electron beam irradiation dose range, the chains of the chitin-based solid material can promote the cleavage to the chitin-based solid material to dissociate the chitin-based solid material.

That is, the degree of polymerization of chitin can be adjusted according to the electron beam irradiation dose, and as the electron beam irradiation dose increases within the electron beam irradiation dose range, the degree of polymerization (DP) of the chitin-based solid material can be significantly reduced.

The degree of polymerization of the chitin-based solid material subjected to electron beam irradiation may be 100 to 500, specifically 190 to 400.

Further, by irradiating a chitin-based solid material with an electron beam in the electron beam irradiation range, it can promote oxidization of a hydroxy group (—OH) of the chitin-based solid material to a carboxylate group (—COO$^-$) to dissociate the chitin-based solid material. And since the chitin-based solid material is oxidized from a hydroxy group (—OH) to a carboxylate group (—COO$^-$), the chitin-based solid material subjected to electron beam irradiation may exist in a stable suspension state when dispersed in an aqueous system.

Next, the chitin-based solid material subjected to electron beam irradiation is washed (S200).

The S200 may be a step of washing the chitin-based solid material subjected to electron beam irradiation in order to remove the oligomerized chitin-based solid substance or impurities, after irradiating a chitin-based solid material with an electron beam in the S100.

Specifically, the chitin-based solid material subjected to electron beam irradiation is injected into a filter together with water, so that the oligomerized chitin-based solid material is dissolved in water and removed together with impurities, thereby obtaining the chitin-based solid material subjected to electron beam irradiation which is not dissolved in water.

Next, a basic solution is added to the washed chitin-based solid material (S300).

The S300 may be a step of adding a basic solution to the washed chitin-based solid material, in order to facilitate high-pressure homogenization of the washed chitin-based solid material and improve the redispersibility of the finally obtained chitin nanocrystals.

Specifically, in order to facilitate high-pressure homogenization of the washed chitin-based solid material and improve the redispersibility of the finally obtained chitin nanocrystals, the S300 may be a step in which the chitin-based solid material subjected to electron beam irradiation is washed with water in the S200, to remove water in which the oligomer is dissolved, thereby obtaining a chitin-based solid material subjected to electron beam irradiation, which is then dispersed in water again to form a slurry state, and a basic solution is added thereto.

That is, it may be a step of adding a basic solution to the washed chitin-based solid material dispersed in an aqueous system. In the S300, after washing the chitin-based material subjected to electron beam irradiation, a basic solution is added to the washed chitin-based solid material dispersed in an aqueous system to adjust the pH to 9 to 11, specifically pH 11.

When a basic solution is added to the washed chitin-based solid material dispersed in an aqueous system to adjust the pH to 9 to 11, the chitin-based solid material is swelled with a basic solution, which can be easily nanofibrillated during high-pressure homogenization.

Further, when a basic solution is added to the washed chitin-based solid material dispersed in an aqueous system to adjust the pH to 9 to 11, the chitin-based solid material introduces a counter ion by a basic solution, which prevent strong hydrogen bonds generated during spray drying and facilitate redispersibility of the finally obtained chitin nanocrystal powder.

Specifically, it may be a step of irradiating the chitin-based solid material with an electron beam, adding a basic solution to the chitin-based solid material in which a hydroxy group (—OH) of the chitin-based solid material is oxidized to a carboxylate group (—COO$^-$), and introducing Na$^+$ or K$^+$, which is a counter ion having a charge opposite in sign to the carboxylate group (—COO$^-$) charge.

At this time, the basic solution may be a sodium hydroxide solution or a potassium hydroxide solution.

After washing the chitin-based material subjected to electron beam irradiation, the S300 is a step of removing water in which the oligomer is dissolved, to obtain the chitin-based solid material subjected to electron beam irradiation, and then dispersing it in water again to form a slurry state, adding a basic solution to the washed chitin-based solid material dispersed in an aqueous system to adjust the pH to 9 to 11, and then stirring the resulting mixture for 1 to 2 hours.

When stirring for the time in the above range, the washed chitin-based solid material is evenly swelled, which can thus be easily nanofibrillated during high-pressure homogenization.

Next, the chitin-based solid material dispersed in an aqueous system to which the basic solution is added is homogenized under high pressure to prepare a suspension containing chitin nanocrystals (S400).

The S400 may be a step of high-pressure homogenizing the chitin-based solid material dispersed in an aqueous system to which the basic solution is added, to subject the chitin-based solid material to nanofibrillation, and transmitting a strong shear force to the chitin-based solid material to separate a chitin-based solid material, specifically a chitin fiber fragment, thereby producing chitin nanocrystal.

The high-pressure homogenization is a type of mechanical treatment, and may be performed by any one device selected from the group consisting of a high pressure homogenizer, a grinding device, a pulverizing device, and an ultrasonicator, and it is preferred to use a high-pressure homogenizer.

The high-pressure homogenization may be carried out less than 1 to 5 times at 20 to 25° C. under a pressure of 20,000 to 25,000 psi.

When the high-pressure homogenization is carried out two or more times, the chitin-based solid material dispersed in an aqueous system to which a basic solution is added is high-pressure homogenized twice at 20 to 25° C. under a pressure of 20,000 to 25,000 psi, and then impurities settled through centrifugation are removed to obtain chitin nanocrystals.

Further, when the high-pressure homogenization is repeated one or more times, chitin nanocrystals having a high yield can be produced.

The chitin nanocrystals produced through the high-pressure homogenization have an average width of 10 to 20 nm and an average length of 261 to 757 nm.

The chitin nanocrystals obtained through the high-pressure homogenization have greatly increased thermal stability and permeability, and can maintain high dispersion stability when redispersed in a water system.

Next, the suspension containing the chitin nanocrystals is neutralized (S500).

The S500 may be a step of neutralizing the suspension to enhance the product properties and produce neutral chitin nanocrystal powder.

The suspension containing the chitin nanocrystals may be pH 9 to 11, specifically pH 11.

Air may be injected into the suspension containing chitin nanocrystals having a pH in the above range to neutralize the suspension having pH 9-11 by the carbon dioxide contained in air.

Next, the neutralized suspension is dried to obtain a chitin nanocrystal powder (S600).

The S600 may be a step of obtaining a chitin nanocrystal powder by drying the neutralized suspension in order to facilitate storage and transport of the suspension containing the chitin nanocrystals produced in S400.

Specifically, the neutralized suspension may be spray dried to obtain a chitin nanocrystal powder.

The spray drying may be performed at a temperature of 90 to 120° C., specifically 100 to 110° C.

When spray drying is performed within the temperature range, powdery chitin nanocrystals that are completely dried (water content is less than 4%) can be prepared. The spray drying may not be sufficiently dried at a temperature of 100° C. or less, and decomposition by heat may occur at a temperature of 170° C. or more.

According to yet another aspect of the present disclosure, the chitin nanocrystal powder according to the present disclosure includes a carboxylate (—COO$^-$) group; and a counter ion having a charge opposite in sign to the carboxylate (—COO$^-$) group charge, by irradiating a chitin-based solid material with an irradiating beam.

The counter ion may be derived from a basic solution, and the counter ion may be Na$^+$ or K$^+$.

The chitin-based solid material is dissociated with an electron beam to form a rod-shaped body.

In the electron beam irradiation range described above, the chitin-based solid material may be dissociated to have a rod-shaped body.

Although exemplary embodiments of the present disclosure have been described for illustrative purposes, those skilled in the art will appreciate that various modifications, additions and substitutions can be made, without departing from the scope and spirit of the disclosure.

Therefore, the embodiments disclosed herein are intended to illustrate the scope of the technical idea of the present disclosure, and the scope of the technical idea of the present disclosure is not limited by the embodiments. The protection scope of the present disclosure should be construed based on the accompanying claims, and all of the technical ideas included within the scope equivalent to the claims should be construed as being included within the right scope of the present disclosure.

EXAMPLE

Example 1

(i) Irradiating a Chitin-Based Solid Material with an Electron Beam.

Chitin powder (Sigma-Aldrich, chitin from shrimp shells (practical grade, powder)) was used as a sample chitin-based solid material.

An ELV-8 accelerator (EBTECH Co., Ltd. Daejeon) was used for the electron beam irradiation treatment. The accelerator is generally classified according to the energy range, wherein the most characteristic of the accelerator is generally classified according to the energy range, and is classified into a low energy of 80-300 keV low energy, a medium energy of 300 KeV-5 MeV and a high energy of 5 MeV or more.

To a 60 cm×60 cm square fiber sheet with an electron beam treatment thickness of less than 0.13 cm and a bulk density of 0.68 g cm$^{-3}$, an electron beam energy was fixed at 1.14 MeV, to form an electron beam flow penetrating a sample at an irradiation dose adjusted to 1000, 2000 and 3000 kGy through electron beam parameters.

All samples subjected to electron beam irradiation were indicated together with the irradiation doses of 1000, 2000, and 3000 for E, which means electron beam, such as E1000, E2000, and E3000.

(ii) Washing the Chitin-Based Material Subjected to Electron Beam Irradiation.

A filtering method was used to remove oligomerized chitin and impurities in the sample subjected to electron beam irradiation. The sample subjected to electron beam irradiation was washed with water, the oligomerized chitin and impurities dissolved in water were filtered, and a washed chitin-based solid material subjected to electron beam irradiation that was not dissolved in water was obtained.

(iii) Adding a Basic Solution to the Washed Chitin-Based Solid Material.

Water was added to the washed sample to prepare into a slurry state in which the washed sample was dispersed, and then 0.5M sodium hydroxide (NaOH) solution was added so that the pH was 11, and the mixture was stirred for 1 hour.

(iv) High-Pressure Homogenizing a Chitin-Based Solid Material Dispersed in an Aqueous System which the Basic Solution was Added, to Prepare a Suspension Containing Chitin Nanocrystals.

The sample dispersed in an aqueous system to which the basic solution was added was homogenized at 25,000 psi using a high pressure disperser (HPH, Mini DeBEE, BEE International, MA) equipped with a diamond nozzle D5 (130 micron) to prepare a suspension containing chitin nanocrystals.

In order to remove the chitin not crystallized in the suspension, centrifugation was performed at 10,000 rpm for 15 minutes to remove settled materials, thereby preparing a suspension containing chitin nanocrystals.

Subsequently, a predetermined amount of the suspension was freeze-dried to confirm thermal properties and degree of crystallinity using a vacuum cooling dryer (SFDSM-24L, Samwon Freezing Engineering Co., Korea).

The chitin nanocrystal powder obtained by drying the suspension containing chitin nanocrystals by high-pressure homogenization after electron beam irradiation treatment was indicated together with the irradiation doses of 1000, 2000, and 3000 for E which means electron beam, such as E1000 ChNC, E2000 ChNC and E3000 ChNC, and ChNC which means chitin nano crystal (ChNC).

Example 2

(a) Irradiating a Chitin-Based Solid Substance with an Electron Beam.

The irradiation was carried out under the same conditions and method as descried in (i) of Example 1.

(b) Washing the Chitin-Based Solid Material Subjected to Electron Beam Irradiation.

The washing was carried out under the same conditions and method as described in (ii) of Example 1.

(c) Adding a Basic Solution to the Washed Chitin-Based Solid Material.

The addition was carried out under the same conditions and method as described in (iii) of Example 1.

(d) High-Pressure Homogenizing a Chitin-Based Solid Material Dispersed in an Aqueous System to which the Basic Solution is Added, to Prepare a Suspension Containing Chitin Nanocrystals.

The sample dispersed in an aqueous system to which a basic solution was added was homogenized at 25,000 psi using a high pressure disperser (HPH, Mini DeBEE, BEE international, MA) equipped with a diamond nozzle D5 (130 micron), to prepare a suspension containing chitin nanocrystals.

In order to remove the chitin not crystallized chitin in the suspension, centrifugation was performed at 10,000 rpm for 15 minutes to remove the settled material, thereby preparing a suspension containing chitin nanocrystals.

(e) Neutralizing the Suspension Containing Chitin Nanocrystals.

Air was injected into the suspension containing the produced chitin nanocrystals to neutralize the pH of the suspension (having pH 11) into pH 8.

(f) Drying the Neutralized Suspension to Obtain Chitin Nanocrystal Powder.

The neutralized suspension was spray dried to obtain chitin nanocrystal powder.

As a variable of the adjustable spray drying process, the flow of air droplets was adjusted to 600 L h$^{-1}$, the supply mount of suspension to 15 mL min$^{-1}$, the concentration of suspension to 0.1% w/w, and the discharge temperature to 107° C.

In order to confirm the redispersibility of the spray-dried chitin nanocrystal powder, the redispersibility was confirmed by two methods.

First, 0.015 g of dried chitin nanocrystal powder was stirred in 15 g of deionized water for 24 hours, and freeze-dried using a vacuum cooling dryer (SFDSM-24L, Samwon Freezing Engineering Co., Korea) to confirm the thermal properties and crystallinity. This was indicated together with R that means redispersibility, such as R-E1000 ChNC-S, R-E2000 ChNC-S and R-E3000 ChNC-S, E which means electron beam, irradiation dose of 1000, 2000, and 3000, ChNC which means chitin nano crystal (ChNC), and S which means stirring.

In addition, 0.015 g of dried chitin nanocrystal powder was added to 15 g of deionized water and dispersed using ultra sonication for 2 minutes, and freeze-dried using a vacuum cooling dryer (SFDSM-24L, Samwon Freezing Engineering Co., Korea) to confirm the thermal properties and crystallinity. This was indicated together with R which means redispersibility, such as R-E1000 ChNC-U, R-E2000 ChNC-U and R-E3000 ChNC-U, E which means electron beam, irradiation dose of 1000, 2000, and 3000, ChNC which means chitin nano crystal (ChNC), and U stands which means ultrasonication.

Comparative Example

Chitin fibers dissociated by a hydrolysis method through acid (HCl) treatment was obtained.

A 500 mL round flask was charged with 10 g of chitin powder and 100 g of deionized water, and then stirred and dissociated at a rate of 300 rpm for 10 minutes.

A hydrochloric acid solution (3 M concentration) was added 10 times using an electric pipette, and acid-hydrolyzed at a temperature of 90° for 90 minutes.

When the acid hydrolysis reaction was completed, the reaction was terminated by cooling in an ice bath, and the precipitate was collected, washed with deionized water until pH 4-5 was reached using litmus test paper, and centrifuged.

The material discharged from the fiber slurry and filtered was named HC in Table 1.

The dissociated chitin solid hydrolyzed (HC sample) with strong acid (HCl) was suspended in deionized water to have a solid content of 0.5 wt %.

The prepared suspension was homogenized to 25,000 psi using a high pressure disperser (HPH, Mini DeBEE, BEE international, MA) equipped with a diamond nozzle D5 (130 micron) to prepare a suspension containing chitin nanocrystals.

Subsequently, a predetermined amount of the suspension was freeze-dried using a vacuum cooling dryer (SFDSM-24L, Samwon Freezing Engineering Co., Korea) to confirm the thermal properties and crystallinity.

It was high-pressure homogenized after strong acid treatment, and the suspension containing chitin nanocrystals was dried, and the obtained chitin nanocrystal powder was shown as HChNC.

EXPERIMENTAL EXAMPLE

Experimental Example 1: Physical Properties of Chitin Powder Subjected to Electron Beam Irradiation The degree of N-acetylation, weight average molecular weight (Mw), polydispersity index (degree of polymerization (DP), crystallinity index (CrI), thermal stability and yield of the chitin powder samples (E1000, E2000 and E3000) subjected to electron beam irradiation at 1000, 2000, and 3000 kGy, the chitin powder sample not subjected to electron beam irradiation (E0000), and the chitin fibers (HC) hydrolyzed with strong acid as control group are shown in Table 1 below.

TABLE 1

| Sample | Degree of N-acetylation (%) | $M_w$ (Kg/mol) (Đ) | DP | Carboxylate content (mmol/g) | CrI (%) | $T_{d\ onset}$ (° C.) | $T_{d\ max}$ (° C.) | Yield (%) |
|---|---|---|---|---|---|---|---|---|
| E0000 | 93.5 | 4921.2 (4.2) | 24580 | 0.45 ± 0.04 | 89 | 281 | 354 | 95 |
| E1000 | 99.5 | 78.3 (1.7) | 385 | 0.19 ± 0.01 | 89 | 262 | 346 | 82 |
| E2000 | 99.5 | 47.3 (1.4) | 232 | 0.27 ± 0.02 | 87 | 252 | 335 | 62 |
| E3000 | 99.5 | 39.4 (1.4) | 192 | 0.24 ± 0.01 | 83 | 239 | 326 | 45 |
| HC | 96.5 | 694.8 (1.8) | 3449 | 0.12 ± 0.02 | 94 | 279 | 352 | 37 |

Experimental Example 2: Physical Properties of Chitin Nanocrystal Powder

For the chitin nanocrystal powder (E1000 ChNC, E2000 ChNC and E3000 ChNC) obtained by drying a suspension containing chitin nanocrystals subjected to high-pressure homogenization treatment after electron beam irradiation treatment, the chitin nanocrystal powder (R-E1000 ChNC-S, R-E2000 ChNC-S and R-E3000 ChNC-S) obtained by re-dispersing the dried chitin nanocrystals by stirring, and then drying them again, the chitin nanocrystal powder (R-E1000 ChNC-U, R-E2000 ChNC-U and R-E3000 ChNC-U) obtained by re-dispersing by the dried chitin nanocrystals by ultrasonication and then drying them again, and the chitin nanocrystal powder (HChNC) obtained by drying a suspension containing chitin nanocrystals by high pressure homogenization after strong acid treatment as a control, the yield, length and width of chitin nanocrystals, transmittance, surface charge, crystallinity index (CrI) and thermal stability were measured and shown in Table 2 below.

TABLE 2

| sample | Yield (%) | Length (nm) | Width (nm) | Transmittance (%) | Charge (mV) | CrI (%) | $T_{d\ onset}$ (° C.) | $T_{d\ max}$ (° C.) |
|---|---|---|---|---|---|---|---|---|
| E1000 ChNC | 99.0 | 606 ± 104 | 16 ± 5 | 92.2 | −32.1 ± 0.4 | 92 | 223 | 343 |
| E2000 ChNC | 99.0 | 471 ± 89 | 13 ± 5 | 93.5 | −34.1 ± 0.3 | 89 | 222 | 340 |
| E3000 ChNC | 99.0 | 261 ± 73 | 11 ± 4 | 95.7 | (−33.8 ± 1.2) | 84 | 222 | 340 |
| HChNC | 98.0 | 586 ± 146 | 19 ± 5 | 95.8 | 39.8 ± 1.0 | 94 | 280 | 362 |
| R-E1000 ChNC-S | 96.8 | 583 ± 83 | 12 ± 4 | 96.4 | −37.0 ± 0.4 | 89 | 223 | 330 |
| R-E1000 ChNC-U | 96.0 | 521 ± 71 | 12 ± 3 | 96.5 | −37.7 ± 1.9 | 87 | 230 | 338 |

Experimental Example 3: Structural Analysis

1) Field Emission Scanning Electron Microscope Measurement

After irradiating the chitin powder with an electron beam, a field emission scanning electron microscope (FE-SEM, Tescan, Czech Republic) was measured to confirm the structural change, and the results are shown in FIG. 3. FIG. 3A is a field emission scanning electron micrograph of chitin powder not subjected to electron beam irradiation, FIG. 3B is a field emission scanning electron micrograph of chitin powder subjected to electron beam irradiation at 1000 KGy, FIG. 3C is a field emission scanning electron micrograph of chitin powder subjected to electron beam irradiation at 2000 KGy, and FIG. 3D is a field emission scanning electron micrograph of chitin powder subjected to electron beam irradiation at 3000 KGy.

Referring to FIG. 3, it was found that when the electron beam is irradiated to the chitin powder, the length and width of the fibers present on the surface of the chitin were shortened.

2) FT-IR and Solid-State $^{13}$C-NMR Measurement

To confirm the effect of the chitin powder on the electron beam irradiation treatment, Fourier transform infrared spectroscopy was performed using an Alpha-T FT-IR spectrometer equipped with an attenuated total reflectance (ATR system, Bruker, Mass.)

Figure 4A:
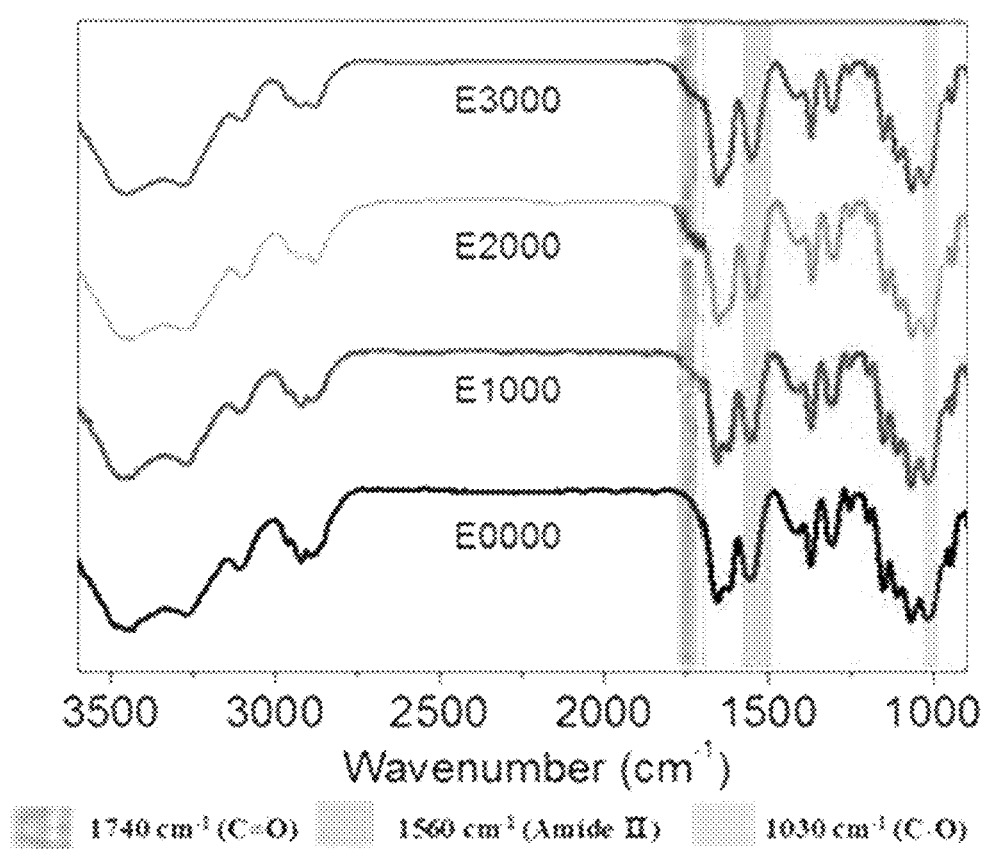
FIG. 4A shows FTIR spectral spectrum of chitin powders according to the irradiation doses of 0, 1000, 2000 and 3000 kGy.

The analysis results of the chitin powder samples (E1000, E2000 and E3000) subjected to electron beam irradiation at 1000, 2000, and 3000 kGy and the chitin powder samples (E0000) not subjected to electron beam irradiation were obtained from 4000 to 400 cm$^{-1}$ with a resolution of 4 cm$^{-1}$ in a reflection mode, and the results are shown in FIG. 4A.

In addition, the chitin powder samples (E1000, E2000 and E3000) subjected to electron beam irradiation at 1000, 2000, and 3000 kGy and the chitin powder samples (E0000) not subjected to electron beam irradiation were freeze-dried, and then solid-state $^{13}$C-NMR spectrum was measured. The results are shown in FIG. 4B.

Figure 4B:
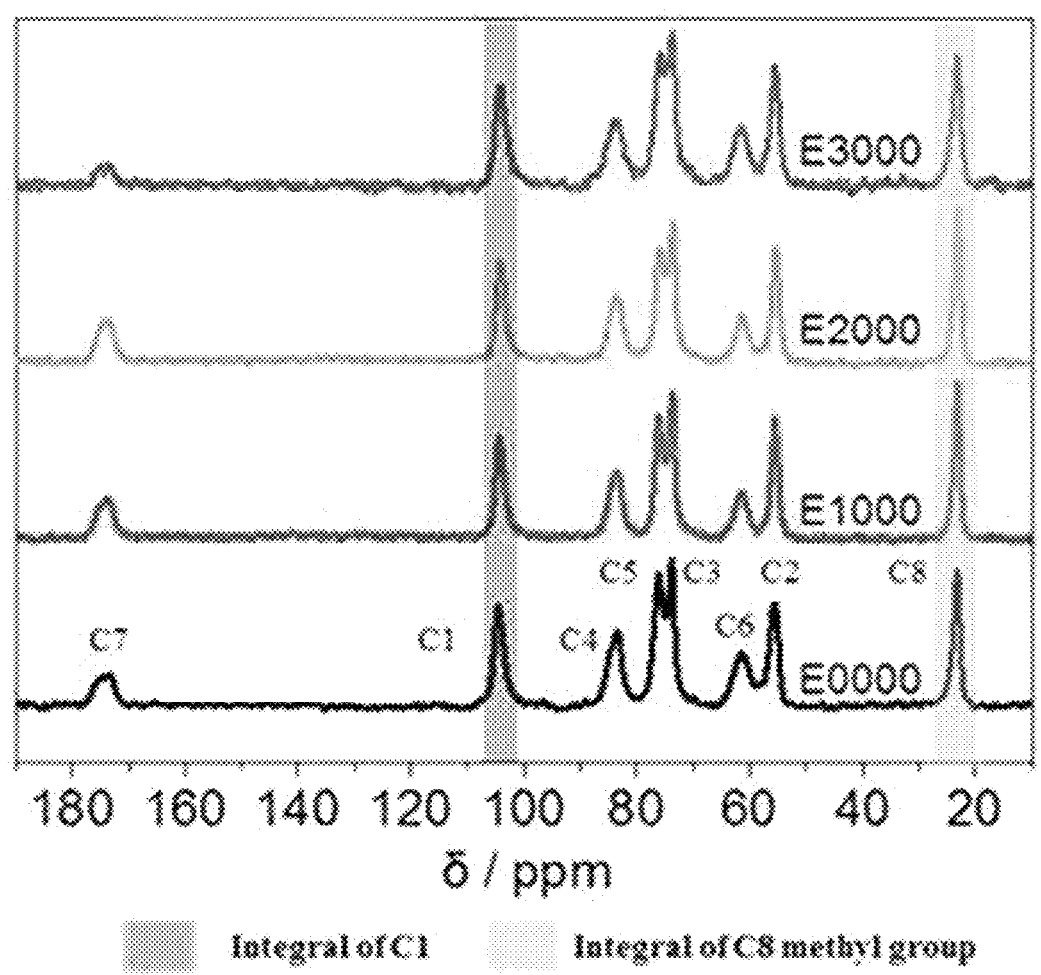
FIG. 4B shows solid-state $^{13}$C-NMR spectrum of chitin powders according to the irradiation doses of 0, 1000, 2000 and 3000 kGy, in the method for extracting chitin nanocrystals through electron beam irradiation according to the present disclosure.

Referring to FIGS. 4A and 4B, it was confirmed that the FT-IR spectrum and the solid-state $^{13}$C-NMR spectrum changed in chemical structure when comparing the samples (E1000, E2000 and E3000) irradiated with an electron beam and the sample (E0000) not irradiated with an electron beam.

Referring to FIG. 4A, it was confirmed that a new peak of 1730 cm$^{-1}$ (C=O) appears in a sample irradiated with electron beams (E1000, E2000, and E3000), and it was confirmed that the intensity ratios of the peaks at 1560 cm$^{-1}$ (amide II) and 1030 cm$^{-1}$ (C—O) peaks increased.

Referring to FIG. 4B, it was confirmed that the ratio of Integral C8/Integral C1 increased in the samples irradiated with electron beams (E1000, E2000, and E3000). This is specifically shown in Table 3 below.

TABLE 3

| Sample | A1560/A1030 | Integral C8/ Integral C1 | Degree of deacetylation (%) |
|---|---|---|---|
| E0000 | 0.74 | 0.935 | 6.5 |
| E1000 | 0.79 | 0.995 | 0.5 |
| E2000 | 0.79 | 0.995 | 0.5 |
| E3000 | 0.79 | 0.995 | 0.5 |

That is, it was confirmed that the samples irradiated with an electron beam (E1000, E2000, and E3000) were subjected to electron beam irradiation, and then most of the amino groups were removed by washing with water to reduce the degree of deacetylation.

Experimental Example 4: Measurement of Weight Average Molecular Weight, Polydispersity Index and Degree of Polymerization For the chitin powder samples (E1000, E2000 and E3000) subjected to electron beam irradiation at 1000, 2000, and 3000 kGy, the chitin powder sample (E0000) not subjected to electron beam irradiation, and the chitin fiber (HC) treated with an acid (HCl), the weight average molecular weight (Mw), polydispersity (D) and degree of polymerization were respectively measured by a size exclusion chromatography (SEC) under the following conditions. The results are shown in Table 1 above.

Column: KD-806M×3 (shodex, Tokyo, japan)
Mobile phase: 0.9% (w/w) LiCl/DMAc
Flow rate: 1.0 mL/min
Temperature: 40° C.

Referring to Table 1, it was confirmed that that the weight average molecular weight, polydispersity index, and degree of polymerization of the chitin powder samples (E1000, E2000, and E3000) subjected to electron beam irradiation at 1000, 2000, and 3000 kGy were reduced, as compared with those of the chitin powder sample (E0000) not subjected to electron beam irradiation. In particular, it was confirmed that as the irradiation dose increased, the weight average molecular weight, polydispersity index, and polymerization degree decreased.

Further, it was confirmed that the weight average molecular weight, polydispersity index, and degree of polymerization of the chitin powder samples (E1000, E2000, and E3000) subjected to electron beam irradiation at 1000, 2000, and 3000 kGy were reduced as compared with those of the chitin fibers (HC) treated with an acid (HCl).

Experimental Example 5: Measurement of Carboxylate Content and Degree of Deacetylation 1) Measurement of Yield After the samples before and after subjecting the chitin powder to electron beam irradiation were washed for 30 minutes, the oligomer dissolved in water was removed through a filtering method. A chitin powder (water-insoluble fraction) precipitated without being dissolved in water was obtained and then dried to confirm the dry weight. The yield was calculated through the ratio of the initial dry weight of the sample subjected to electron beam irradiation and the dry weight after washing. The results are shown in Table 1 and FIG. 5A.

Figure 5A:
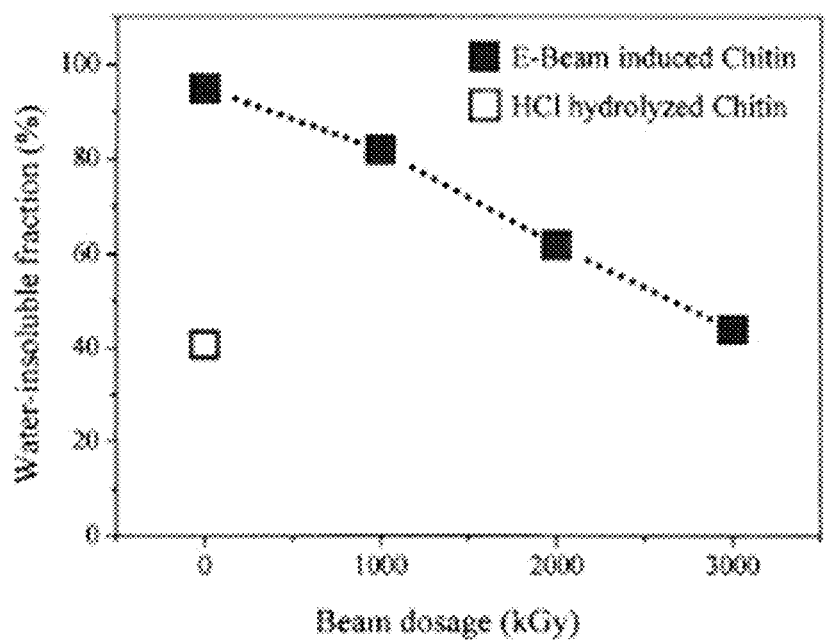
FIG. 5A shows the yield of the samples before and after subjecting the chitin powders to electron beam irradiation.

Referring to Table 1 and FIG. 5A, after subjecting to electron beam irradiation at 1000, 2000, and 3000 kGy, oligomerized chitin fibers dissolved in impurities and water were removed using deionized water. It was confirmed that as the irradiation dose is higher, the degree of polymerization of the chitin fibers is lower and the portion of the oligomerized chitin fiber dissolved in water increased, and thus, the yield was lowered.

2) Measurement of Carboxylate Content

The carboxylate content (mmol g$^{-1}$) of the water-insoluble portion was measured by an electric conductivity titration method using a titrator (888 Tirando, Metrohm AG, Switzerland). The results are shown in Table 1 and FIG. 5B.

Figure 5B:
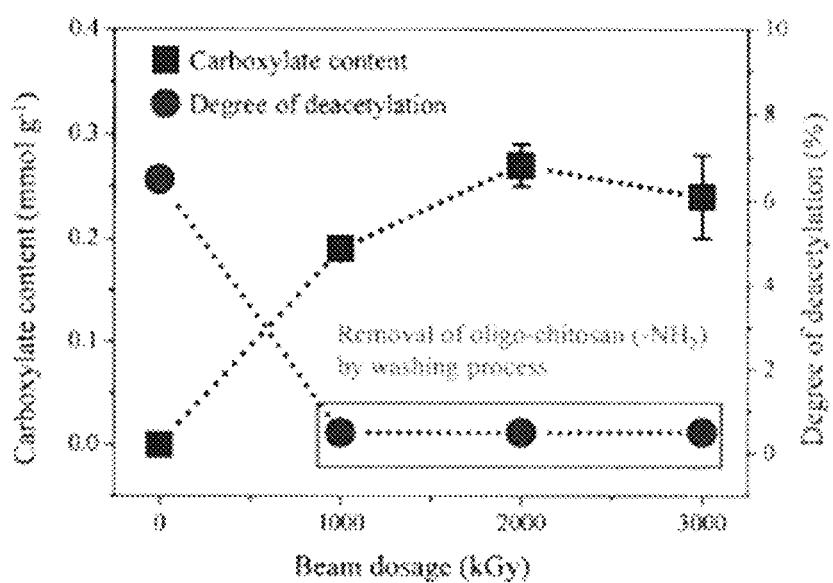
FIG. 5B shows the carboxylate content and degree of deacetylation of chitin powders according to the irradiation doses of 0, 1000, 2000 and 3000 kGy, in the method for extracting chitin nanocrystals through electron beam irradiation according to the present disclosure.
Figure 6A:
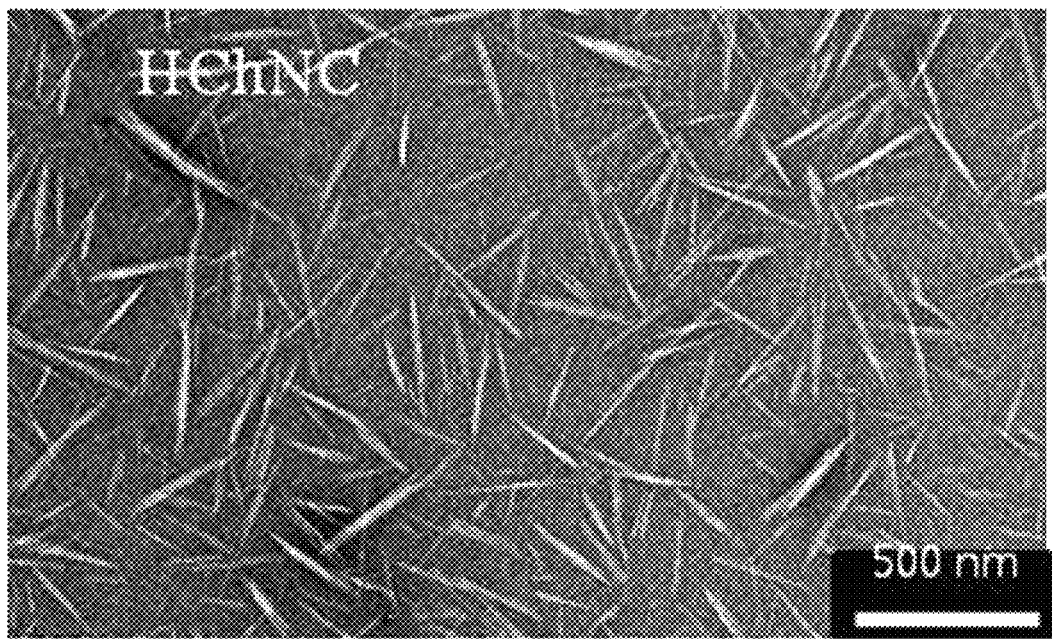
FIG. 6A is transmission electron micrographs of chitin nanocrystal powders produced according to the irradiation doses of 0 kGy and chitin nanocrystal powders produced by a strong acid treatment.
Figure 6B:
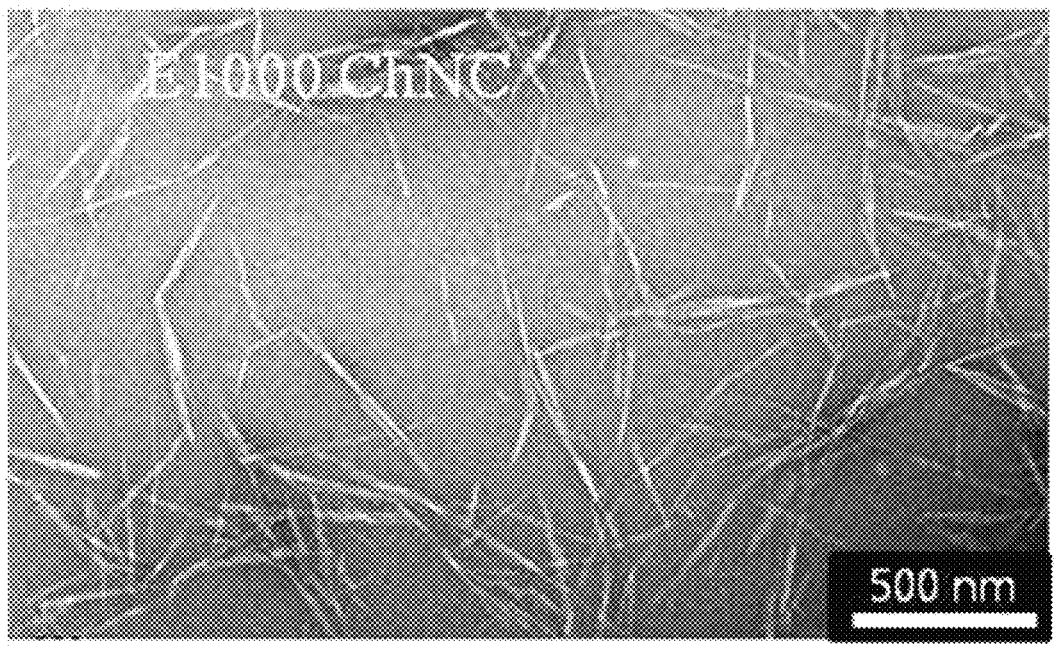
FIG. 6B is transmission electron micrographs of chitin nanocrystal powders produced according to the irradiation doses of 1000 kGy and chitin nanocrystal powders produced by a strong acid treatment.
Figure 6C:
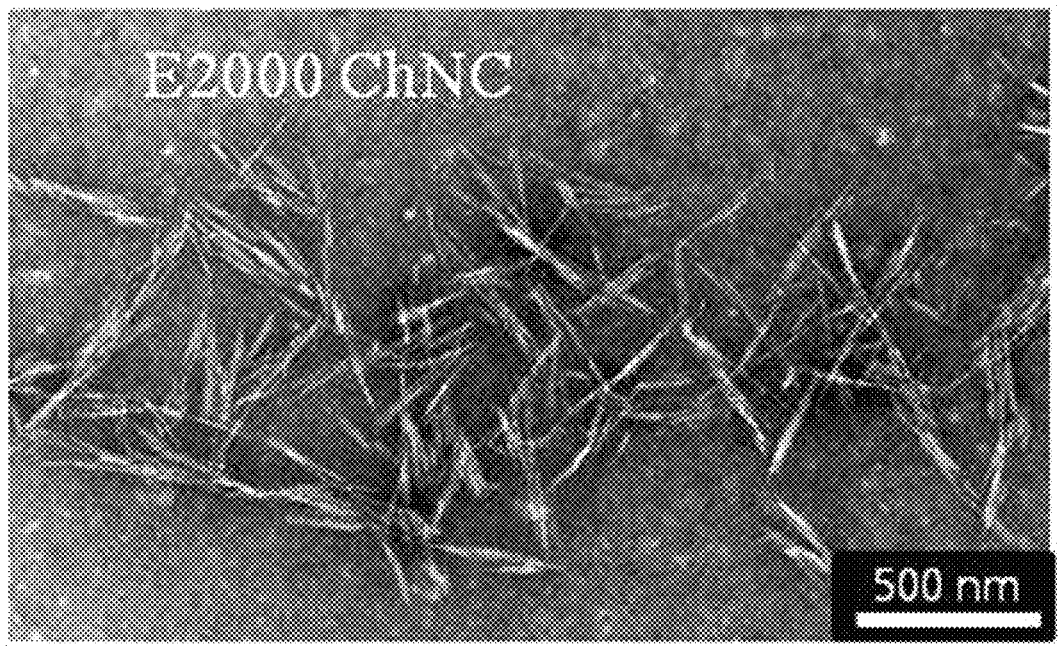
FIG. 6C is transmission electron micrographs of chitin nanocrystal powders produced according to the irradiation doses of 2000 kGy and chitin nanocrystal powders produced by a strong acid treatment.
Figure 6D:
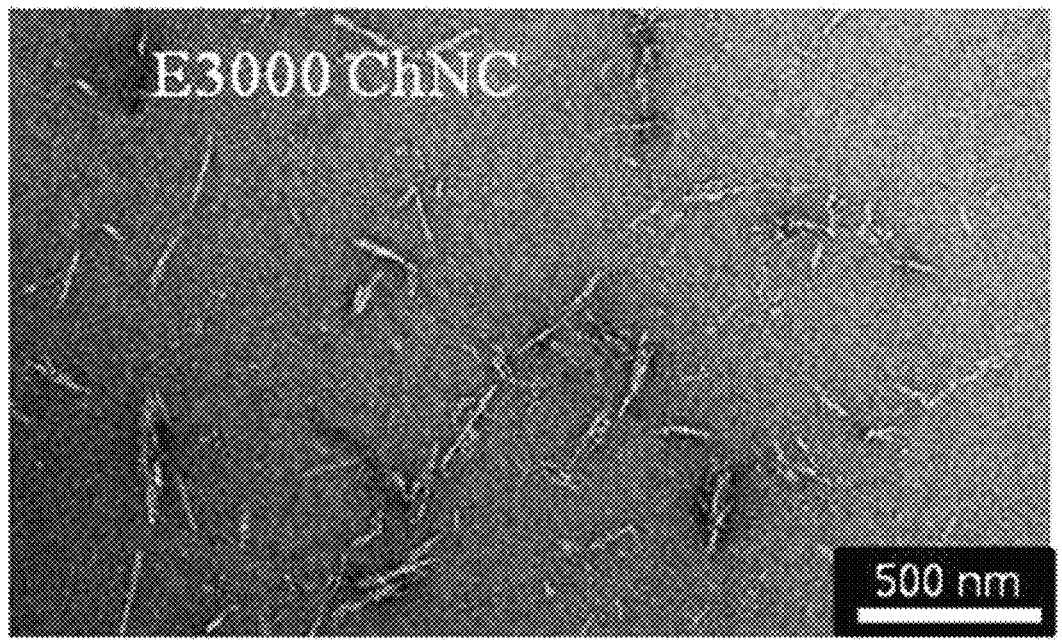
FIG. 6D is transmission electron micrographs of chitin nanocrystal powders produced according to the irradiation doses of 3000 kGy and chitin nanocrystal powders produced by a strong acid treatment, in the method for extracting chitin nanocrystals through electron beam irradiation according to the present disclosure.

Referring to Table 1 and FIG. 5B, it can be confirmed that as the irradiation dose increases, a hydroxy group (—OH) of chitin powder is oxidized to a carboxylate group (—COO$^-$), and so the carboxylate content increases.

3) Measurement of Degree of Deacetylation

The deacetylation degree of chitin fibers was calculated based on the values of the ratio of A1560/A1030 in Table 3 and the ratio of Integral C8/C1 measured by FT-IR and Solid $^{13}$C-NMR, with reference to the prior art literature.

According to the prior art literature (Fan et al. Chitin nanocrystals prepared by TEMPO-mediated oxidation of α-chitin. Biomacromolecules 9 (2008) 192-198), it can be seen that when the ratio of A1560/A1030 is 0.71-0.75, the degree of deacetylation of chitin fibers is 0.10-0.05.

According to prior art literature (Goodrich et al. α-Chitin nanocrystals prepared from shrimp shells and their specific area measurement. Biomacromolecules 8 (2007) 252-257), it can be seen that the ratio of Integral C8/Integral C1 indicates the degree of acetylation of chitin fibers, and the degree of deacetylation is shown via the formula (1−acetylation)×100. The results are shown in Table 3 and FIG. 5B.

Referring to Table 3 and FIG. 5B, it can be confirmed that the degree of deacetylation was reduced by removing most of the amino groups by washing with water after electron beam irradiation treatment.

Experimental Example 6: Analysis of Shape

Chitin nanocrystal powder samples (E1000 ChNC, E2000 ChNC and E3000 ChNC) obtained by drying the suspension containing chitin nanocrystals by high-pressure homogenization after electron beam irradiation treatment, and the suspension containing chitin nanocrystals obtained by high-pressure homogenizing after strong acid treatment were dried, and the obtained chitin nanocrystal powder sample (HChNC) was confirmed by a transmission electron microscope (TEM, Tecnai G2 T20 S-Twin) operated with a 200 kV voltage accelerator. This was shown in FIG. 6.

Referring to FIG. 6, it was confirmed that both the chitin nanocrystal powder samples (E1000 ChNC, E2000 ChNC and E3000 ChNC) obtained by high-pressure homogenization after electron beam irradiation treatment, and the chitin nanocrystal powder samples (HChNC) obtained by high-pressure homogenization after strong acid treatment had a rod-shaped structure.

In the case of chitin nanocrystal powder samples (E1000 ChNC, E2000 ChNC and E3000 ChNC) obtained by high pressure homogenization after electron beam irradiation treatment, it was confirmed that as the irradiation dose increased, the length and width of the chitin nanocrystals decreased.

The chitin nanocrystal powder sample (E1000 ChNC) obtained by drying a suspension containing chitin nanocrystals by high-pressure homogenization after electron beam irradiation treatment, and the samples (R-E1000 ChNC-S, R-E1000 ChNC-U) for confirming the redispersibility of the dried obtained chitin nanocrystal powder were confirmed by a transmission electron microscope (TEM, Tecnai G2 T20 S-Twin) operated with a 200 kV voltage accelerator. This is shown in FIG. 7.

Figure 7A:
FIG. 7A is transmission electron micrographs of chitin nanocrystal powder (E1000 ChNC) prepared according to the irradiation dose of 1000 kGy.
Figure 7B:
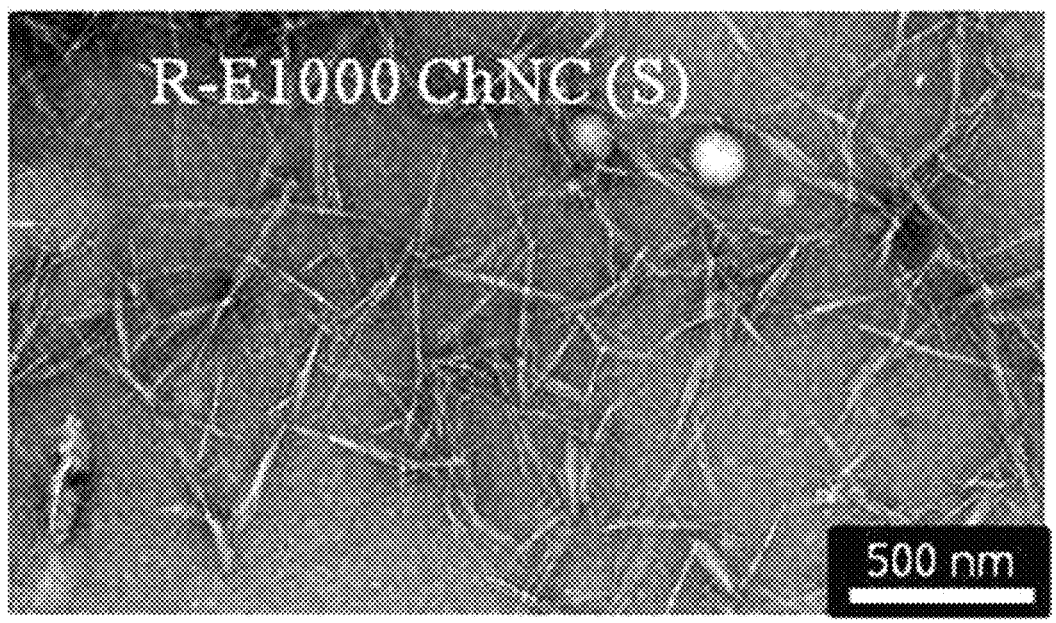
FIG. 7B is transmission electron micrographs of chitin nanocrystal powder (R-E1000 ChNC-S) prepared according to chitin nanocrystal powder spray-dried by redispersing the chitin nanocrystal powder.
Figure 7C:
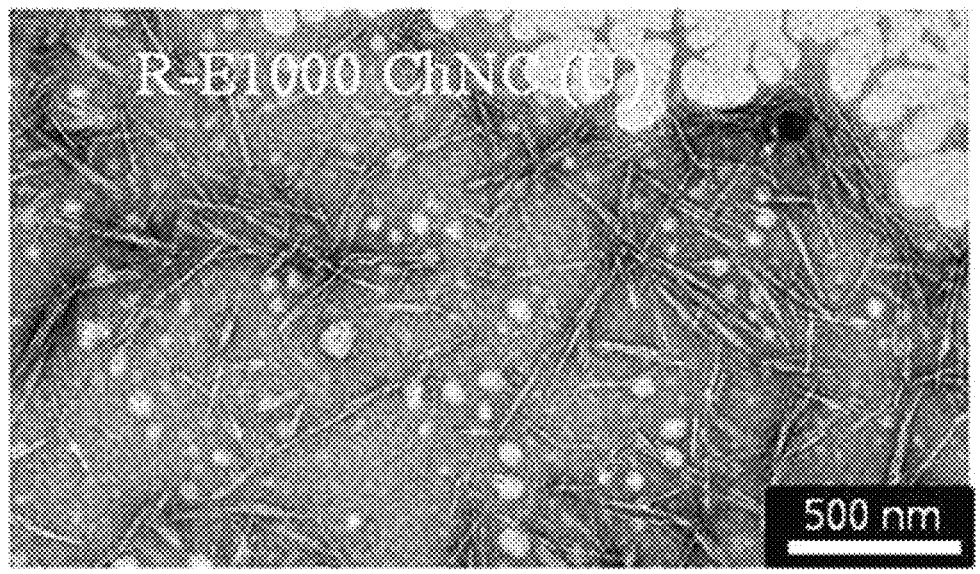
FIG. 7C is transmission electron micrographs of chitin nanocrystal powder (R-E1000 ChNC-U) prepared according to chitin nanocrystal powder spray-dried by redispersing the chitin nanocrystal powder, in the method for extracting chitin nanocrystals through electron beam irradiation according to the present disclosure.

Referring to FIG. 7, it was confirmed that the chitin nanocrystal powder obtained by high-pressure homogenization after the electron beam irradiation treatment according to the present disclosure was easily dispersed in water, and it was confirmed that it was present in a stable suspension state.

Experimental Example 7: Confirmation of Thermal Stability

Thermogravimetric analysis (TGA) was performed to confirm the degradation behavior of the dried samples of all the degraded chitin powders and dried samples of chitin nanocrystals prepared according to Examples and Comparative Examples.

The samples (5 to 10 mg) freeze-dried using a TA Q500 thermogravimetric analyzer under a nitrogen atmosphere were heated from 25° C. to 600° C. at 20° C. min$^{-1}$ under a nitrogen atmosphere, and weighed in an aluminum crucible. The thermogravimetric analysis curves were recorded. The results are shown in FIG. 8.

Figure 8A:
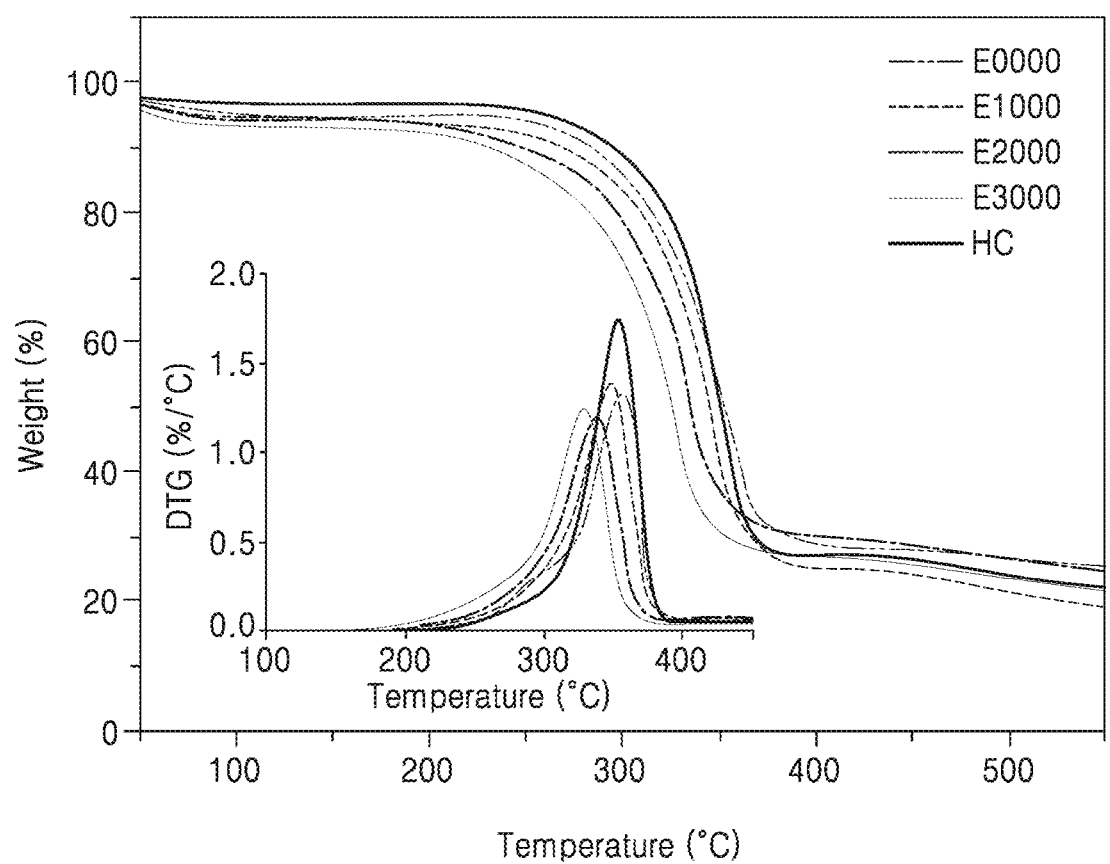
FIG. 8A is a graph showing the thermogravimetric analysis result of chitin nanocrystals containing samples before high-pressure homogenization after irradiating a chitin powder with an electron beam and samples obtained by conventional acid hydrolysis, in the method for extracting chitin nanocrystals through electron beam irradiation according to the present disclosure.
Figure 8B:
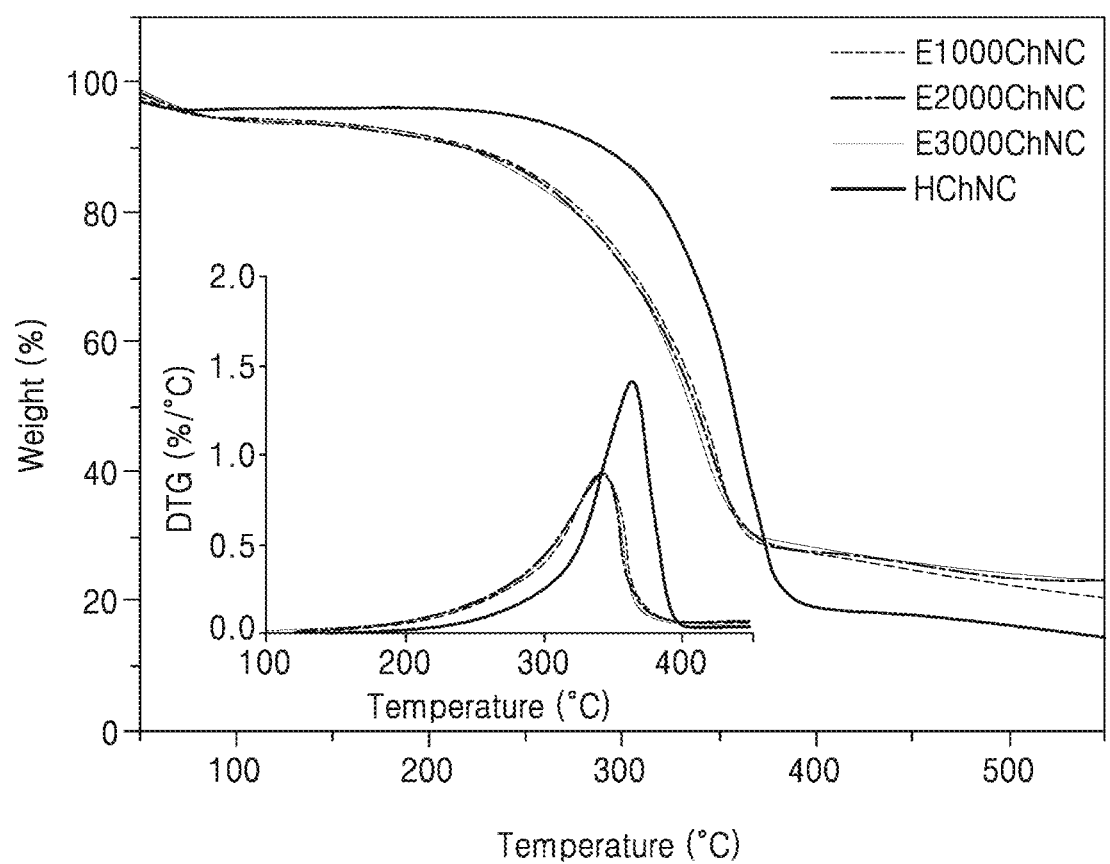
FIG. 8B is a graph showing the thermogravimetric analysis result of chitin nanocrystals containing samples after high-pressure homogenization after irradiating a chitin powder with an electron beam and samples obtained by conventional acid hydrolysis, in the method for extracting chitin nanocrystals through electron beam irradiation according to the present disclosure.

Specifically, FIG. 8A is a graph showing the thermogravimetric analysis result of chitin nanocrystals containing samples before high-pressure homogenization after irradiating a chitin powder with an electron beam and samples obtained by conventional acid hydrolysis, in the method for extracting chitin nanocrystals through electron beam irradiation according to the present disclosure, and FIG. 8B is a graph showing the thermogravimetric analysis result of chitin nanocrystals containing samples after high-pressure homogenization after irradiating a chitin powder with an electron beam and samples obtained by conventional acid hydrolysis, in the method for extracting chitin nanocrystals through electron beam irradiation according to the present disclosure, Referring to FIG. 8A, it was confirmed that the chitin powder samples (E1000, E2000, and E3000) subjected to electron beam irradiation showed similar thermal properties to the samples (HC) obtained by conventional acid hydrolysis.

Further, referring to FIG. 8B, it was confirmed that the chitin nanocrystal powder samples (E1000 ChNC, E2000 ChNC, and E3000 ChNC) obtained by high-pressure homogenization after electron beam irradiation treatment also showed similar thermal properties to the samples (HChNC) obtained by acid hydrolysis.

Consequently, the chitin nanocrystal powder obtained by high pressure homogenization after electron beam irradiation treatment can be used as a nano filler of a commercial polymer or nanocomposite.

Experimental Example 8: Crystallinity

The dried samples of decomposed chitin powder and chitin nanocrystals produced according to Examples and Comparative Examples were confirmed by measuring, by X-ray diffraction, the crystallinity according to electron beam irradiation treatment and high pressure-homogenization process.

The sample was placed on an X-ray diffractometer [XRD, Rigaku Ultima IV, Cu radiation ($\lambda$=0.154 nm)] operated at 40 kV and 40 mA, and X-ray diffraction photographs were obtained by scanning at $2\theta$ at a speed of $0.03°$ $\sec^{-1}$ in the range of $5°$ to $40°$.

In order to confirm and quantify the actual crystallinity values, a curve fitting method with an integrated X-ray powder diffraction program was used. The results are shown in FIG. 9.

Figure 9A:
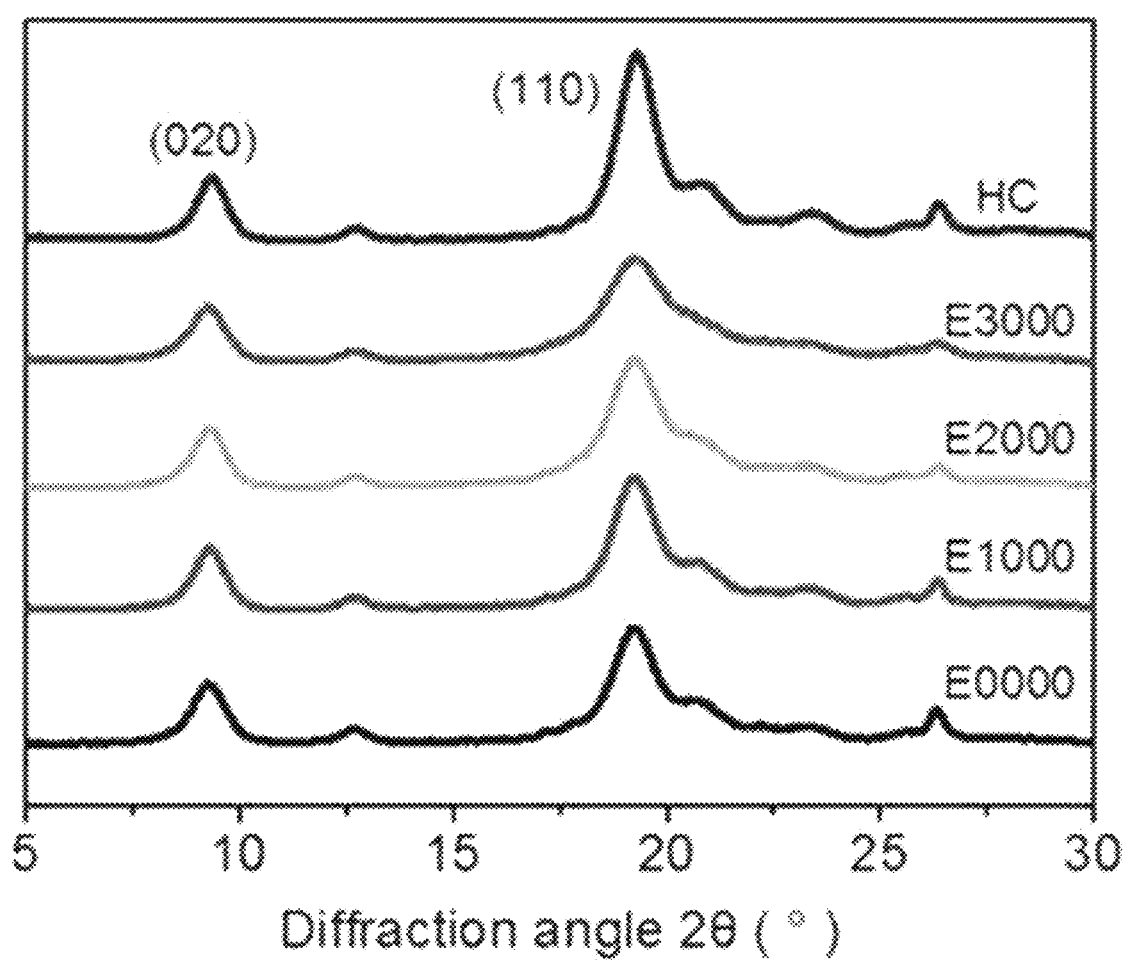
FIG. 9A is a graph showing the X-ray diffraction analysis result of chitin nanocrystals containing samples before high-pressure homogenization after irradiating a chitin powder with an electron beam and samples obtained by conventional acid hydrolysis, in the method for extracting chitin nanocrystals through electron beam irradiation according to the present disclosure.
Figure 9B:
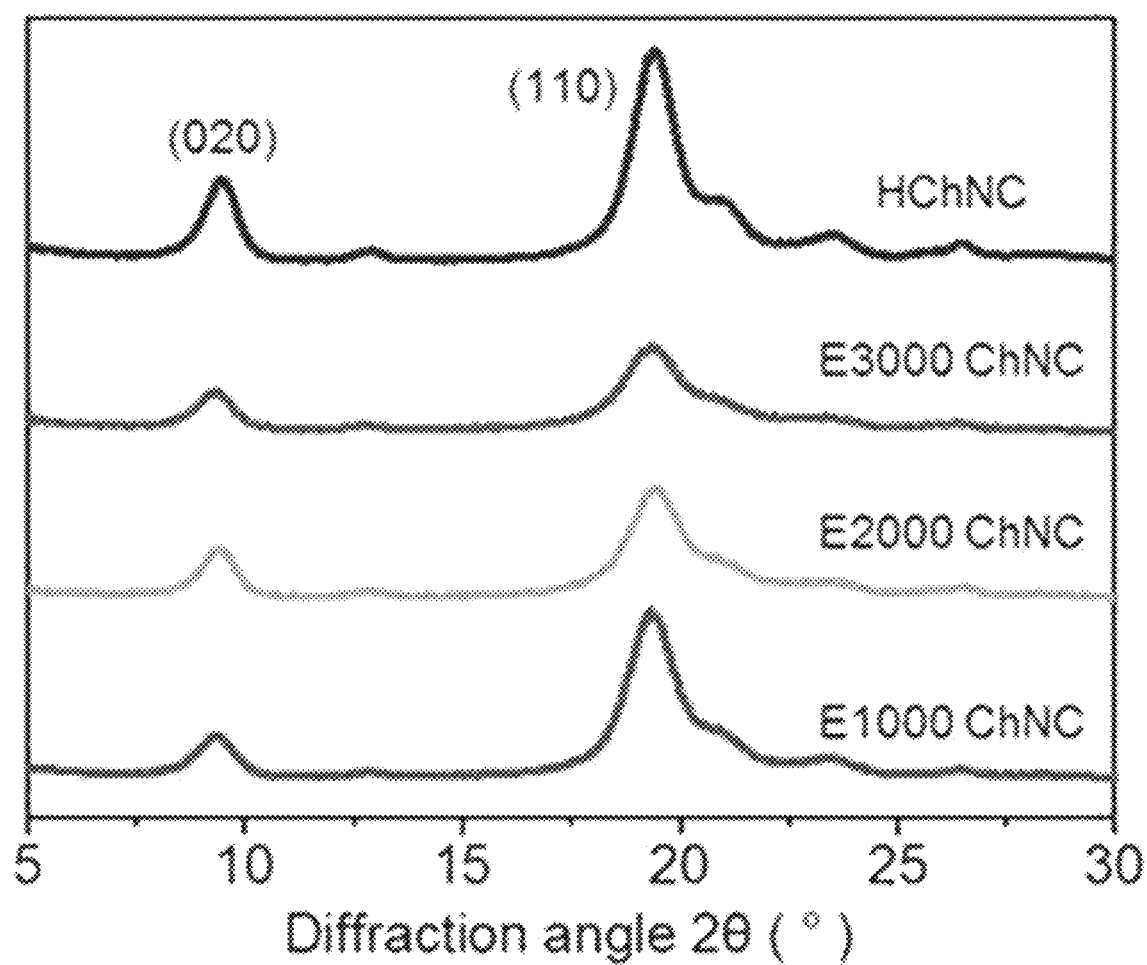
FIG. 9B is a graph showing the X-ray diffraction analysis result of chitin nanocrystals containing samples after high-pressure homogenization after irradiating a chitin powder with an electron beam and samples obtained by conventional acid hydrolysis, in the method for extracting chitin nanocrystals through electron beam irradiation according to the present disclosure.

FIG. 9A is a graph showing the X-ray diffraction analysis result of chitin nanocrystals containing samples before high-pressure homogenization after irradiating a chitin powder with an electron beam and samples obtained by conventional acid hydrolysis, in the method for extracting chitin nanocrystals through electron beam irradiation according to the present disclosure, and FIG. 9B is a graph showing the X-ray diffraction analysis result of chitin nanocrystals containing samples after high-pressure homogenization after irradiating a chitin powder with an electron beam and samples obtained by conventional acid hydrolysis, in the method for extracting chitin nanocrystals through electron beam irradiation according to the present disclosure.

Referring to FIG. 9, it can be confirmed that the crystallinity of chitin nanocrystals before and after high pressure homogenization after irradiating chitin powder with an electron beam does not change.

Experimental Example 9: Measurement of Surface Charge

Zeta potential was measured to confirm the surface charge of chitin nanocrystals.

Figure 10A:
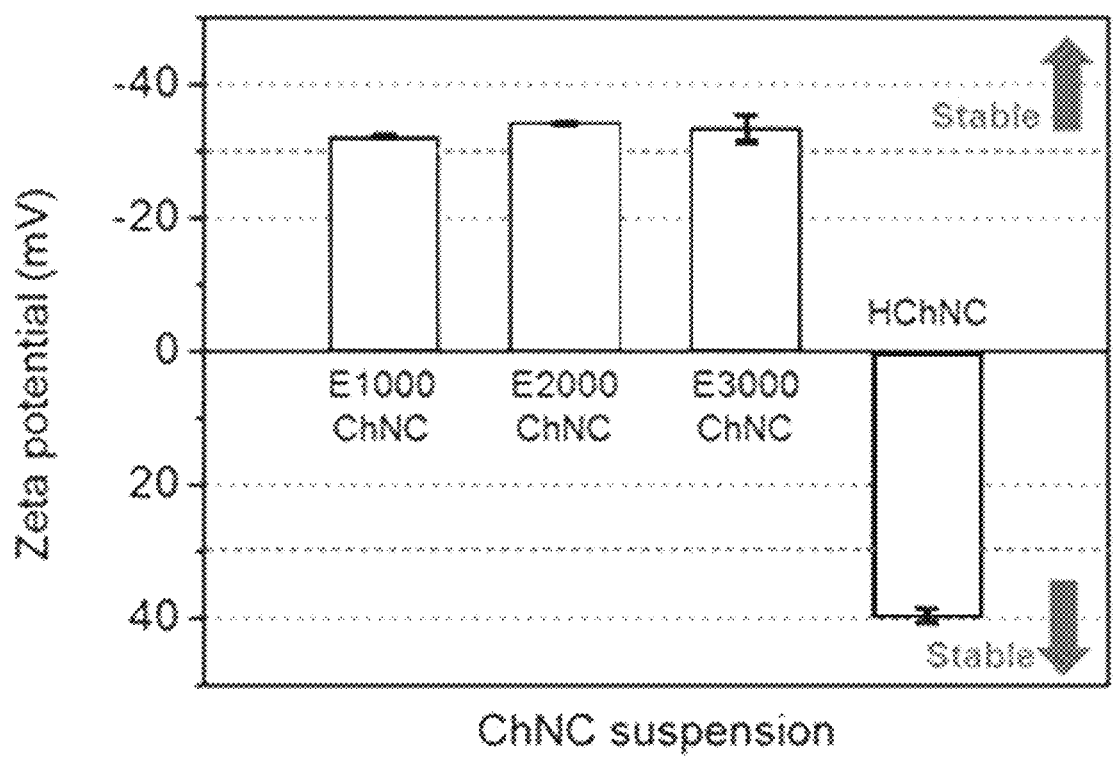
FIG. 10A is a graph showing the zeta potential of chitin nanocrystal suspension and FIG. 10B shows the ultraviolet-visible light transmission spectrum of chitin nanocrystal suspension (0.1% w/w), in the method for extracting chitin nanocrystals through electron beam irradiation according to the present disclosure.

A laser-dropper-velocimetry (LDV, Zetasizer Nano ZS series, Malvern Instruments Ltd, UK) was used, and the zeta potential of the chitin nanocrystal solution (1% w/v) was measured by dispersing at $25°$. The results are shown in FIG. 10A.

Known values were used for the dielectric constant and the viscosity of water to derive the zeta potential value calculated from the electrophoretic mobility.

Transmittance was also determined using a UV-vis spectrometer (UV-vis spectrometer, Simadzu, UV01659PC, Japan) at visible wavelengths ranging from 400 to 600 nm.

Figure 10B:
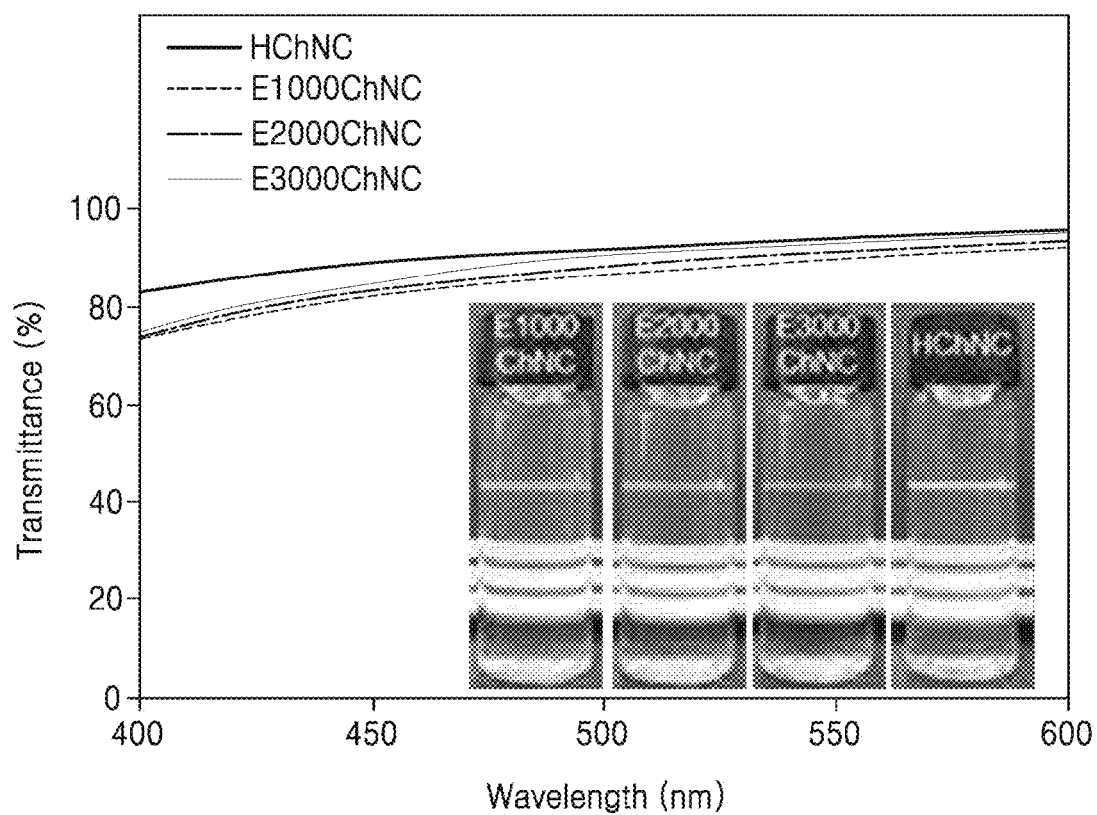
Figure 11A:
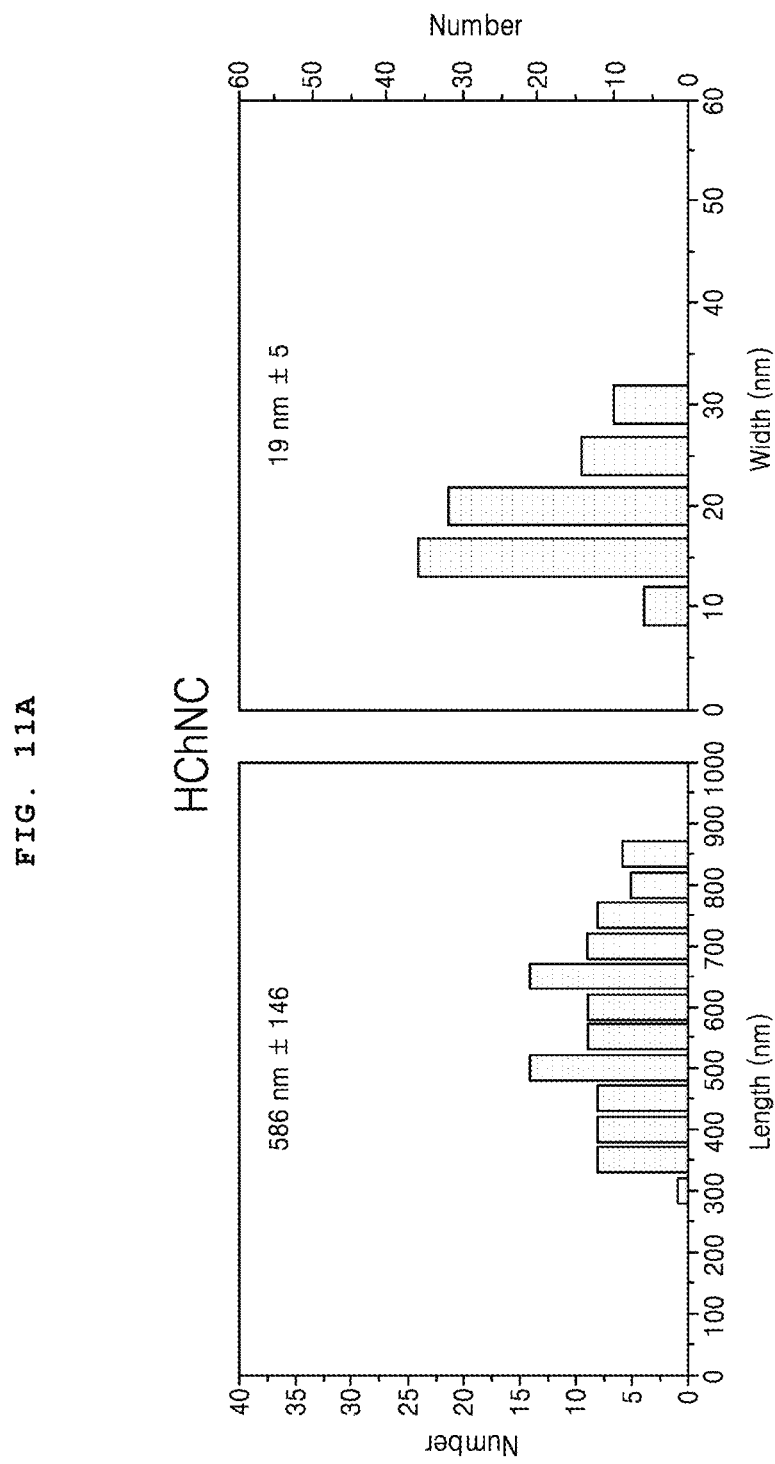
FIG. 11A is a dispersion histogram showing the length and width according to the electron beam irradiation dose (0 kGy) of a chitin-based solid material.
Figure 11B:
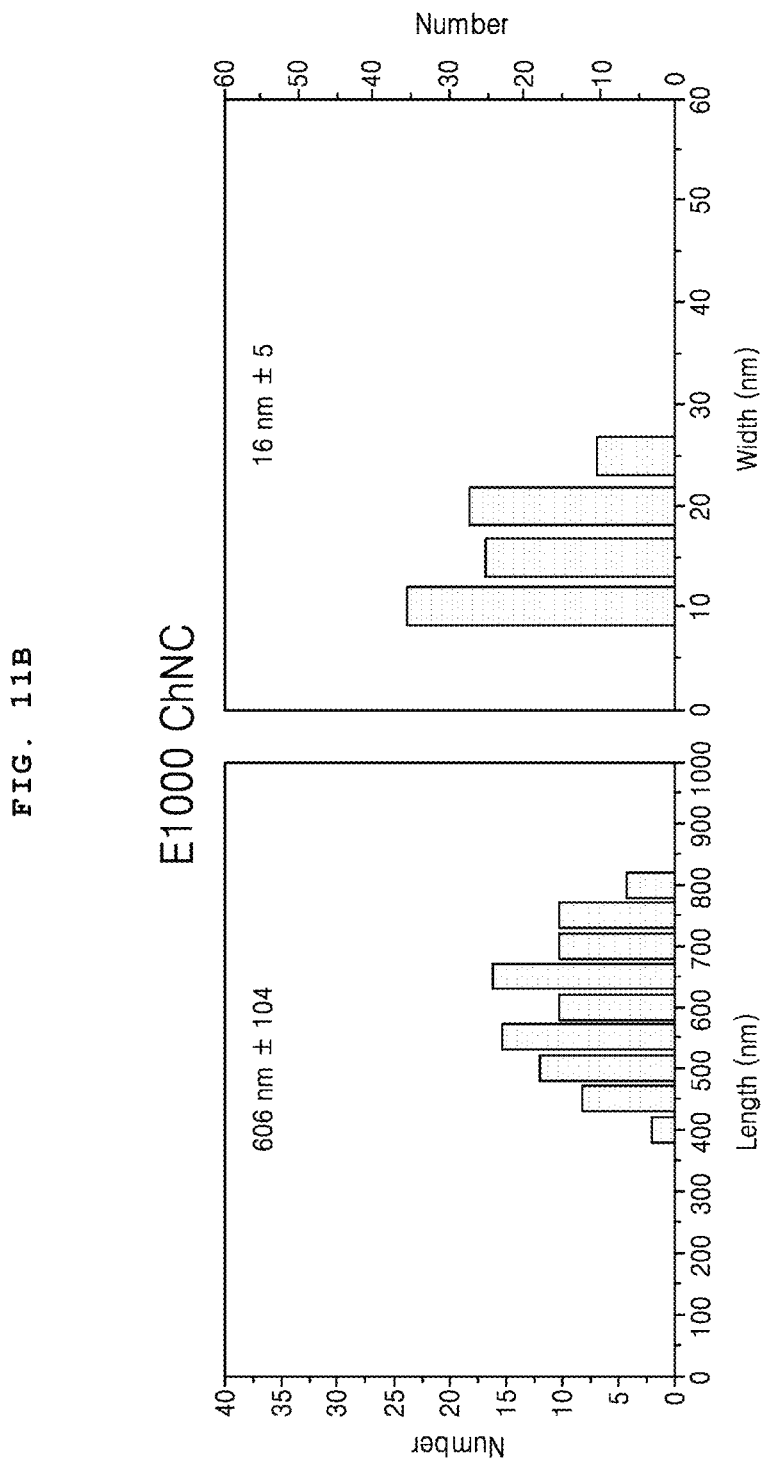
FIG. 11B is a dispersion histogram showing the length and width according to the electron beam irradiation dose (1000 kGy) of a chitin-based solid material.
Figure 11C:
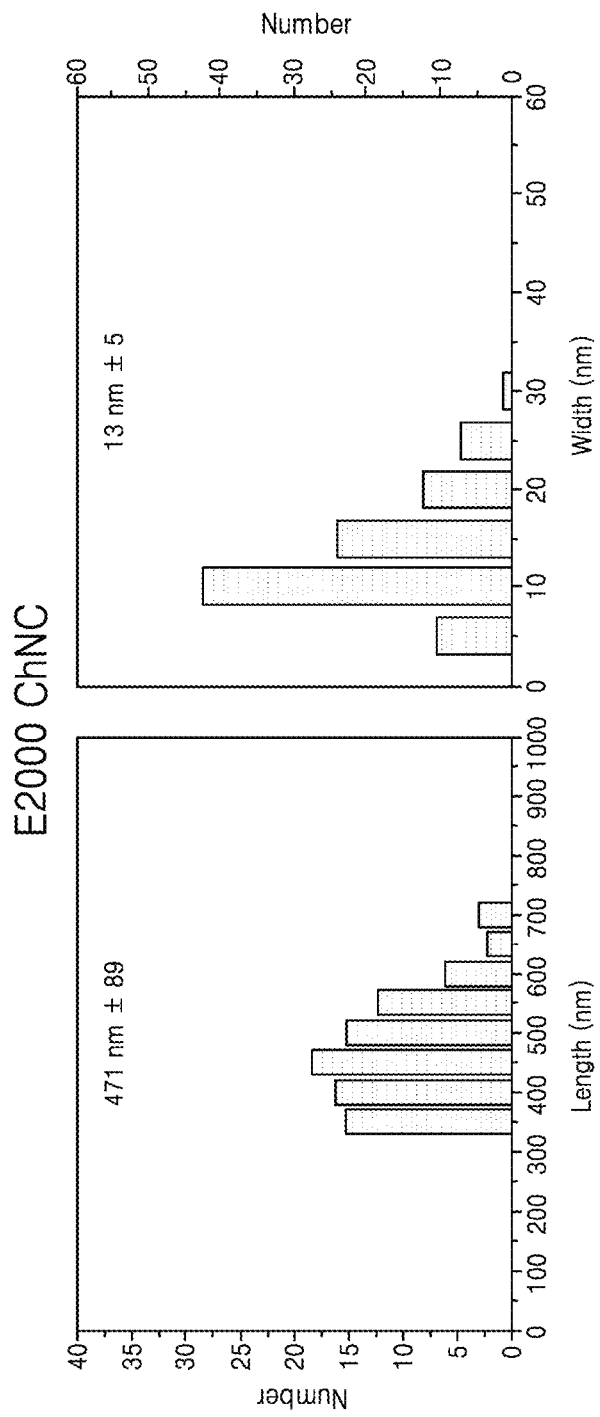
FIG. 11C is a dispersion histogram showing the length and width according to the electron beam irradiation dose (2000 kGy) of a chitin-based solid material.
Figure 11D:
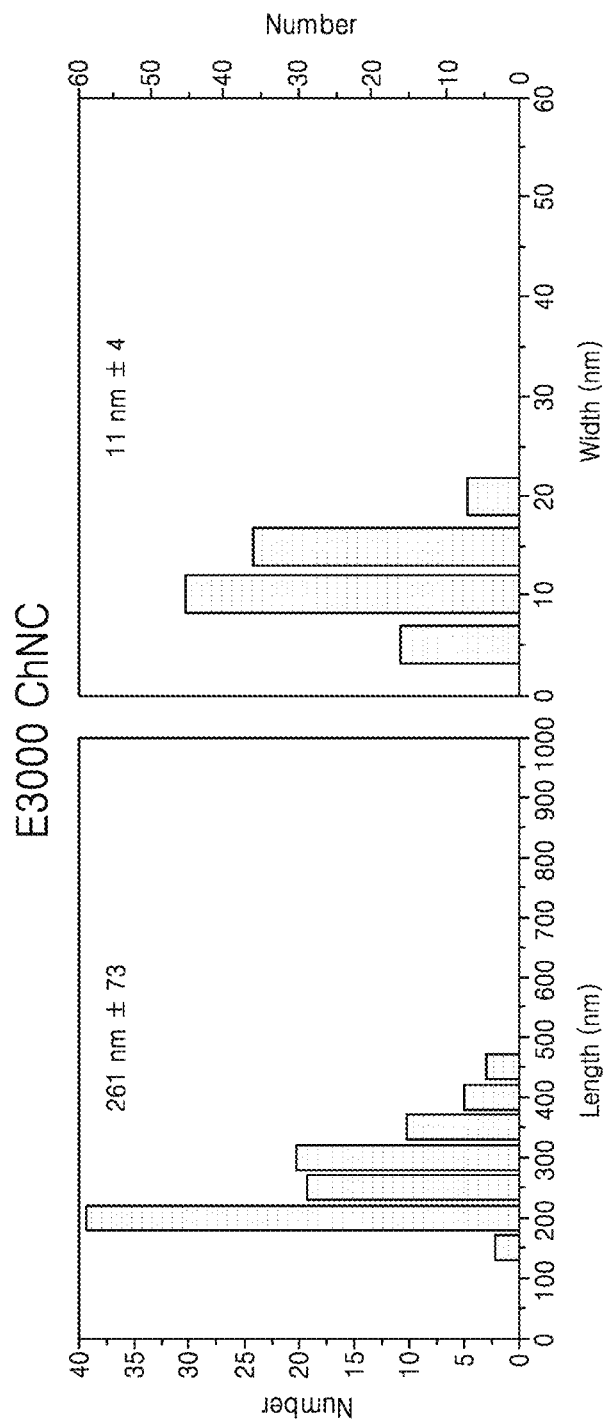
FIG. 11D is a dispersion histogram showing the length and width according to the electron beam irradiation dose (3000 kGy) of a chitin-based solid material, in the method for extracting chitin nanocrystals through electron beam irradiation according to the present disclosure.

The spectrum of the cuvette filled with water and the spectrum when it was empty was measured to collect the transmittance of the chitin nanocrystal solution sample (0.1% w/w). The results are shown in FIG. 10B.

The absolute value of the zeta potential should be 30 mV or more to produce a stable suspension.

Referring to FIG. 10A, it can be confirmed that it has a zeta potential value of −30 mV. Thereby, referring to FIG. 10B, the stable suspension state can be confirmed.

In order to obtain chitin nanocrystals without strong acid hydrolysis treatment, disclosed therein is a new environmentally friendly dissolution method through an electron beam treatment and a mild and simple alkali treatment at normal temperature and pressure.

In particular, the strong electron beam irradiation treatment of 1000 to 3000 kGy significantly reduced the degree of polymerization of chitin powder, and the content of carboxylate in the chitin powder was increased.

This is very important for the thermal stability, permeability, and high dispersion stability without aggregation of chitin nanocrystals produced through high pressure dispersion.

The produced chitin nanocrystals showed uniform width and adjustable length of rod shape as compared with those produced through conventional acid hydrolysis, and also exhibited a reasonable crystallinity, similar negative surface charge and improved thermal stability.

Therefore, the present disclosure provides a new method for producing chitin nanocrystals which are environmentally friendly, sustainable, and can be widely applied to high value-added products.

So far, although a specific embodiment of the method for extracting chitin nanocrystals through electron beam irradiation according to the present disclosure has been described, it will be apparent that the invention is intended to cover various modifications included within the sprit and scope of the present disclosure.

Therefore, the scope of the present disclosure should not be construed as being limited to the embodiments described, but should be determined by equivalents of the appended claims, as well as the following claims.

That is, it is to be understood that the foregoing embodiments are illustrative and not restrictive in all respects and that the scope of the present disclosure is indicated by the appended claims rather than the foregoing description, and all changes or modifications derived from the equivalents thereof should be construed as being included within the scope of the present disclosure.

What is claimed is:

1. A method for extracting chitin nanocrystals through electron beam irradiation comprising the steps of:
   (i) irradiating a chitin-based solid material with an electron beam;
   (ii) washing the chitin-based solid material subjected to electron beam irradiation;
   (iii) adding a basic solution to the washed chitin-based solid material;
   (iv) high-pressure homogenizing the chitin-based solid material dispersed in an aqueous system to which the basic solution is added, to prepare a suspension containing chitin nanocrystals.

2. A method for extracting chitin nanocrystals through electron beam irradiation comprising the steps of:
(a) irradiating a chitin-based solid material with an electron beam;
(b) washing the chitin-based solid material subjected to electron beam irradiation;
(c) adding a basic solution to the washed chitin-based solid material;
(d) high-pressure homogenizing the chitin-based solid material dispersed in an aqueous system to which the basic solution is added, to prepare a suspension containing chitin nanocrystals,
(e) neutralizing suspension containing chitin nanocrystals; and
(f) drying the neutralized suspension to obtain a chitin nanocrystal powder.

3. The method for extracting chitin nanocrystals through electron beam irradiation according to claim 1, wherein the electron beam irradiation dose is 1000 to 3000 KGy.

4. The method for extracting chitin nanocrystals through electron beam irradiation according to claim 1, wherein the step (i) or (a) is a step of irradiating a chitin-based solid material with an electron beam to oxidize a hydroxy group (—OH) of the chitin-based solid material to a carboxylate (—COO—) group.

5. The method for extracting chitin nanocrystals through electron beam irradiation according to claim 1, wherein the step (ii) or (b) is a step of filtering and washing with water the chitin-based solid material subjected to electron beam irradiation.

6. The method for extracting chitin nanocrystals through electron beam irradiation according to claim 1, wherein the step (iii) or (c) is a step of adding a basic solution to the washed chitin-based solid material to adjust the pH to 9 to 11.

7. The method for extracting chitin nanocrystals through electron beam irradiation according to claim 1, wherein the step (iii) or (c) is a step of irradiating a chitin-based solid material with an electron beam to oxidize a hydroxy group (—OH) of the chitin-based solid material to a carboxylate (—COO$^-$) group, and adding a basic solution thereto to introduce Na+ or K+, which is a counter ion having a charge opposite in sign to the carboxylate (—COO—) group charge.

8. The method for extracting chitin nanocrystals through electron beam irradiation according to claim 1, wherein the chitin nanocrystals have an average width of 10 to 20 nm and an average length of 261 to 757 nm.

9. The method for extracting chitin nanocrystals through electron beam irradiation according to claim 1, wherein the high-pressure homogenization is performed less than 1-5 times at 20 to 25° C. under a pressure of 20,000 to 25,000 psi.

10. The method for extracting chitin nanocrystals through electron beam irradiation according to claim 2, wherein the step (e) is a step of injecting an air containing carbon dioxide into the suspension containing chitin nanocrystals to neutralize the suspension.

11. The method for extracting chitin nanocrystals through electron beam irradiation according to claim 2, wherein the electron beam irradiation dose is 1000 to 3000 KGy.

12. The method for extracting chitin nanocrystals through electron beam irradiation according to claim 2, wherein the step (i) or (a) is a step of irradiating a chitin-based solid material with an electron beam to oxidize a hydroxy group (—OH) of the chitin-based solid material to a carboxylate (—COO—) group.

13. The method for extracting chitin nanocrystals through electron beam irradiation according to claim 2, wherein the step (ii) or (b) is a step of filtering and washing with water the chitin-based solid material subjected to electron beam irradiation.

14. The method for extracting chitin nanocrystals through electron beam irradiation according to claim 2, wherein the step (iii) or (c) is a step of adding a basic solution to the washed chitin-based solid material to adjust the pH to 9 to 11.

15. The method for extracting chitin nanocrystals through electron beam irradiation according to claim 2, wherein the step (iii) or (c) is a step of irradiating a chitin-based solid material with an electron beam to oxidize a hydroxy group (—OH) of the chitin-based solid material to a carboxylate (—COO$^-$) group, and adding a basic solution thereto to introduce Na+ or K+, which is a counter ion having a charge opposite in sign to the carboxylate (—COO—) group charge.

16. The method for extracting chitin nanocrystals through electron beam irradiation according to claim 2, wherein the chitin nanocrystals have an average width of 10 to 20 nm and an average length of 261 to 757 nm.

17. The method for extracting chitin nanocrystals through electron beam irradiation according to claim 2, wherein the high-pressure homogenization is performed less than 1-5 times at 20 to 25° C. under a pressure of 20,000 to 25,000 psi.

* * * * *